US008954324B2

(12) United States Patent
Wang et al.

(10) Patent No.: US 8,954,324 B2

(45) Date of Patent: Feb. 10, 2015

(54) MULTIPLE MICROPHONE VOICE ACTIVITY DETECTOR

(75) Inventors: Song Wang, San Diego, CA (US); Samir Kumar Gupta, San Diego, CA (US); Eddie L. T. Choy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1423 days.

(21) Appl. No.: 11/864,897

(22) Filed: Sep. 28, 2007

(65) Prior Publication Data

US 2009/0089053 A1 Apr. 2, 2009

(51) Int. Cl.
*G10L 15/20* (2006.01)
*G10L 11/06* (2006.01)
(Continued)

(52) U.S. Cl.
CPC ....... *G10L 25/78* (2013.01); *G10L 2021/02165* (2013.01)
USPC ........... 704/233; 704/215; 704/216; 704/217; 704/218

(58) Field of Classification Search
CPC ......... G10L 15/20; G10L 21/00; G10L 21/02; G10L 21/0202; G10L 21/0272; G10L 25/00; G10L 25/78; G10L 25/84; G10L 25/87; G10L 25/93; G10L 2021/00; G10L 2021/02; G10L 2021/02165; G10L 2021/02166; G10L 2021/02168; G10L 2025/00; G10L 2025/78; G10L 2025/783; G10L 2025/186; G10L 2025/93; G10L 2025/932; G10L 2025/935; G10L 2025/937
USPC ......... 704/200, 208, 210, 214, 215, 216, 217, 704/218, 226, 233; 381/71.1, 94.1
See application file for complete search history.

(56) References Cited

U.S. PATENT DOCUMENTS

| | | | |
|---|---|---|---|
| 5,276,779 | A | 1/1994 | Statt |
| 5,539,832 | A | 7/1996 | Weinstein |

(Continued)

FOREIGN PATENT DOCUMENTS

| | | | |
|---|---|---|---|
| EP | 0548054 | A2 | 6/1993 |
| EP | 0729288 | | 8/1996 |

(Continued)

OTHER PUBLICATIONS

Wu, B. "Voice Activity Detection Based on Auto-Correlation Function Using Wavelet Transform and Teager Energy Operator," Computational Linguistics and Chinese Language Processing, vol. 11, No. 1, Mar. 2006, pp. 87-100.*

(Continued)

*Primary Examiner* — Paras D Shah
(74) *Attorney, Agent, or Firm* — Espartaco Diaz Hidalgo

(57) ABSTRACT

Voice activity detection using multiple microphones can be based on a relationship between an energy at each of a speech reference microphone and a noise reference microphone. The energy output from each of the speech reference microphone and the noise reference microphone can be determined. A speech to noise energy ratio can be determined and compared to a predetermined voice activity threshold. In another embodiment, the absolute value of the autocorrelation of the speech and noise reference signals are determined and a ratio based on autocorrelation values is determined. Ratios that exceed the predetermined threshold can indicate the presence of a voice signal. The speech and noise energies or autocorrelations can be determined using a weighted average or over a discrete frame size.

25 Claims, 8 Drawing Sheets

(51) Int. Cl.
*G10L 19/00* (2006.01)
*G10L 25/78* (2013.01)
*G10L 21/0216* (2013.01)

(56) References Cited

U.S. PATENT DOCUMENTS

| | | | | |
|---|---|---|---|---|
| 5,825,671 | A | 10/1998 | Deville | |
| 6,526,148 | B1 | 2/2003 | Jourjine et al. | |
| 6,694,020 | B1 | 2/2004 | Benesty | |
| 6,904,146 | B2 | 6/2005 | Domer et al. | |
| 7,020,294 | B2 | 3/2006 | Lee et al. | |
| 7,099,821 | B2 | 8/2006 | Visser et al. | |
| 7,359,504 | B1 | 4/2008 | Reuss et al. | |
| 7,464,029 | B2 * | 12/2008 | Visser et al. | 704/210 |
| 7,496,482 | B2 | 2/2009 | Araki et al. | |
| 7,630,502 | B2 | 12/2009 | Beaucoup et al. | |
| 7,653,537 | B2 * | 1/2010 | Padhi et al. | 704/218 |
| 7,817,808 | B2 * | 10/2010 | Konchitsky et al. | 381/94.7 |
| 8,175,871 | B2 | 5/2012 | Wang et al. | |
| 8,223,988 | B2 | 7/2012 | Wang et al. | |
| 2002/0114472 | A1 | 8/2002 | Lee et al. | |
| 2002/0172374 | A1 | 11/2002 | Bizjak | |
| 2003/0061185 | A1 | 3/2003 | Lee et al. | |
| 2003/0179888 | A1 | 9/2003 | Burnett | |
| 2005/0105644 | A1 | 5/2005 | Baxter et al. | |
| 2006/0013101 | A1 | 1/2006 | Kawana et al. | |
| 2006/0053002 | A1 | 3/2006 | Visser et al. | |
| 2006/0080089 | A1 | 4/2006 | Vierthaler | |
| 2007/0021958 | A1 | 1/2007 | Visser | |
| 2007/0233479 | A1 * | 10/2007 | Burnett | 704/233 |
| 2007/0257840 | A1 | 11/2007 | Wang et al. | |
| 2008/0154592 | A1 | 6/2008 | Tsujikawa | |
| 2008/0317259 | A1 * | 12/2008 | Zhang et al. | 381/92 |
| 2009/0106021 | A1 | 4/2009 | Zurek et al. | |

FOREIGN PATENT DOCUMENTS

| | | | |
|---|---|---|---|
| EP | 0784311 | A1 | 7/1997 |
| EP | 0785419 | A2 | 7/1997 |
| JP | 11298990 | A | 10/1999 |
| JP | 2003005790 | A | 1/2003 |
| JP | 2003241787 | A | 8/2003 |
| JP | 2003333698 | A | 11/2003 |
| JP | 2004274683 | A | 9/2004 |
| JP | 2005227511 | A | 8/2005 |
| JP | 2005227512 | A | 8/2005 |
| JP | 2006510069 | A | 3/2006 |
| JP | 2007193035 | A | 8/2007 |
| JP | 2008507926 | A | 3/2008 |
| RU | 2291499 | | 1/2007 |
| TW | 219993 | | 2/1994 |
| TW | 357260 | | 5/1999 |
| TW | 494669 | B | 7/2002 |
| TW | I264934 | B | 10/2006 |
| WO | 9711538 | | 3/1997 |
| WO | 0195666 | | 12/2001 |
| WO | WO02093555 | | 11/2002 |
| WO | 2004008804 | | 1/2004 |
| WO | WO-2005024788 | A1 | 3/2005 |
| WO | WO2006077745 | A1 | 7/2006 |
| WO | WO2006132249 | A1 | 12/2006 |
| WO | WO-2007130797 | A1 | 11/2007 |

OTHER PUBLICATIONS

Kristjansson, Trausti / Deligne, Sabine / Olsen, Peder (2005): "Voicing features for robust speech detection", in INTERSPEECH-2005, 369-372.*

ETSI EN 301 708 v 7.1.1 (Dec. 1999); "Digital Cellular Telecommunications System (Phase2+); Voice Activity Detector (VAD) for Adaptive Multi-Rate (AMR) Speech Traffic Channels," GSM 06.94 version 7.1.1 Release 1998.

Gupta, S. et al.: "Multiple Microphone Voice Activity Detector," U.S. Appl. No. 11/864,897, filed Sep. 28, 2007.

Hoyt, J. et al.: "Detection of Human Speech in Structured Noise," Dissertation Abstracts International, B: Sciences and Engineering 56 (1), pp. 237-240, 1994.

International Search Report, PCT/US2008/077994, European Patent Office.

Karvanen et al., ("Temporal decorrelation as pre-processing for linear and post-nonliner ICA") (2004).

Lee et al., "Combining time-delayed decorrelation and ICA: Towards solving the cocktail party problem," IEEE (1998).

Written Opinion of the International Searching Authority, PCT/US2008/077994.

Jafari et al, "Adaptive noise cancellation and blind source separation", 4th International Symposium on Independent Component Anaiysis and Blind Signal Separation (ICA2003), pp. 627-632, Apr. 2003.

Le Bouquin-Jeannes R. et al: "Study of a voice activity detector and its influence on a noise reduction system", Speech Communication, Elseview Science Pubushers; Amsterdam, NL, vol. 16, No. 3, Apr. 1, 1995, pp. 245-254.

Mukai et al., "Removal of residual cross-talk component in blind source separation using time-delayed spectral subtraction", pp. 1789-1792, Proc of ICASSP 2002.

Mukai et al., "Removal of residual cross-talk component in blind source separation using LMS filters", pp. 435-444, IEEE 2002.

Digital cellular telecommunication system (phase 2+): voice activity detector for adaptive multi-rate (AMR) speech traffic channels, ETSI Report, DEN/SMG-110694Q7, 2000.

S. F. Boll, Suppression of Acoustic Noise in Speech Using Spectral Subtraction, IEEE Trans. Acoustics, Speech and Signal Processing, 27(2): 112-120, Apr. 1979.

J. Chen and W. Ser, Speech detection using microphone array, Electroinics Letters, 36(2): 181-182, 2000.

Y. D. Cho, K. Al-Naimi, and A. Kondoz, Improved voice activity detection based on a smoothed statistical likelihood ratio, in Proc. ICASSP 2001, pp. 737-740.

N. Doukas, P. Naylor and T. Stathaki, Voice activity detection using source separation techniques, in Proc. Eurospeech 97, pp. 1099-1102, 1997.

A. Guerin, A two-sensor voice activity detection and speech enhancement based on coherence with additional enhancement of low frequencies using pitch information, in Proc. EUSIPCO 2000, 2000.

J. A. Haigh and J. S. Mason, Robust voice activity detection using cepstral features, IEEE TEN-CON, pp. 321-324, 1993.

J. D. Hoyt and H. Wechsler, Detection of human speech in structured noise, in Proc. ICASSP 1994, pp. 237-240, 1994.

J. C. Junqua, B. Reaves, and B. Mak, A study of endpoint detection algorithms in adverse conditions: Incidence on a DTW and HMM recognize, in Proc. Eurospeech 91, pp. 1371-1374, 1991.

R. Mukai, S. Araki, H. Sawada and S. Makino, Removal of residual crosstalk components in blind source separation using LMS filters, in Proc. of 12th IEEE Workshop on Neural Networks for Signal Processing, pp. 435-444, Martigny, Switzerland, Sep. 2002.

R. Mukai, S. Araki, H. Sawada and S. Makino, Removal of residual cross-talk components in blind source separation using time-delayed spectral subtraction, In Proc. of ICASSP 2002, pp. 1789-1792, May 2002.

J. Rosca, R. Balan, N.P. Fan, C. Beaugeant and V. Gilg, Multichannel voice detection in adverse environments, in Proc. EUSIPCO 2002, France, Sep. 2002.

K. Srinivasan and A. Gersho, Voice activity detection for cellular networks,, in Proc. of the IEEE Speech Coding Workshop, pp. 85-86, Oct. 1993.

R. Tucker, Voice activity detection using a periodicity measure, in Proc. Inst. Elect. Eng., vol. 139, pp. 377-380, Aug. 1992.

Q. Zou, X. Zou, M. Zhang and Z. Lin, A robust speech detection algorithm in a microphone array teleconferencing system, in Proc. ICASSP 2001, pp. 3025-3028, 2001.

Caihua Zhao et al: "An effective method on blind speech separation in strong noisy environment" VLSI design and video technology, 2005, Proceedings of 2005 IEEE International Workshop on Suzhou, China May 28-30, 2005 Piscataway, NJ, USA, IEEE May 28, 3005, pp. 211-214.

(56) References Cited

OTHER PUBLICATIONS

Curces S. et al: "Blind separation of convolutive mixtures: A Gauss-Newton algorithm" Higher-order statistics, 1997, Proceedings of the IEEE Signal Processing Workshop on Banff, Alta., Canada Jul. 21-23, 1997, Los Alamitos, CA, IEEE Comput. Soc. US Jul. 21, 1997, pp. 326-330.
Figueroa M. et al: "Adaptive Signal Processing in Mixed-Signal VLSI with Anti-Hebbian Learning" Emerging VLSI technologies and architectures, 2006.
Leong W Y et al: "Blind Mulituser Receiver in Rayleign Fading Channel" Communications Theory Workshop, 2005, Proceedings, 6th Australian Brisbane AUS Feb. 2-4, 2005, Piscataway, NJ, IEEE Feb. 2, 2005 pp. 155-161.
Potter M. et al: "Competing ICA techniques in biomedical signal analysis" Electrical and Computer Engineering, 2001. Canadian conference on May 13-16, 2001 Piscataway, NJ, IEEE May 13, 2001 pp. 987-992.
Siow Yong Low et al: "Spatio-temporal processing for distant speech recognition" Acoustics, speech and signal processing, 2004. Proceedings (ICASSP pr) IEEE International Conference on Montreal, Quebec, Canada May 17-21, 2004, Piscataway, NJ, US, IEEE, vol. 1, May 17, 2004, pp. 1001-1004.
Vrins F. et al: "Improving independent component analysis performances by variable selection" Neural networks for signal processing, 2003. NNSP'03, 2003 IEEE 13th Workshop on Toulouse, France, Sep. 17-19, 2003, Piscataway, NJ, IEEE, Sep. 17, 2003, pp. 359-368.
Ran Lee et al: "Methods for the blind signal separation problem" Neural Networks and Signal Processing, 2003. Proceedings of the 2003 International Conference on Nanjing, China, Dec. 14-17, 2003, Piscataway, NJ, US, IEEE, vol. 2, Dec. 14, 2003, pp. 1386-1389.
International Search Report, PCT/US2007067044, International Search Authority European Patent Office, Sep. 3, 2007.
Barrere Jean et al: "A Compact Sensor Array for Blind Separation of Sources," IEEE Transactions on Circuits and Systems—I: Fundamental Theory and Applications, vol. 49, No. 5, May 2002, pp. 565-574.
Beloucharani Adel et al: "Blind Source Separation Based on Time-Frequency Signal Representations," IEEE Transactions on Signal Processing, vol. 46, No. 11, Nov. 1998, pp. 2888-2897.
Smaragdis Paris, "Efficient Blind Separation of Convolved Sound Mixtures," Machine Listening Group, 1997.
S. Amari, A. Cichocki, and H. H. Yang, A new learning algorithm for blind signal separation, In Advances in Neural Information Processing Systems 8, MIT Press, 1996.
L. Molgedey and H. G. Schuster, Separation of a mixture of independent signals using time delayed correlations, Phys. Rev. Lett., 72(23): 3634-3637, 1994.
L. Parra and C. Spence, "Convolutive blind source separation of non-stationary sources", IEEE Trans. on Speech and Audio Processing, 8(3): 320-327, May 2000.
Wang, Song et al: "Apparatus and Method of Noise and Echo Reduction in Multiple Microphone Audio Systems," U.S. Appl. No. 11/864,906, filed Sep. 28, 2007.
A. Hyvarinen, J. Karhunen and E. Oja, Independent Component Analysis, John Wiley & Sons, NY, 2001.
A. Macovski, Medical Imaging, Chapter 10, pp. 205-211, Prentice-Hall, Englewood Cliffs, New Jersey, 1983.
B. D. Van Veen, "Beamforming: A versatile approach to spatial filtering," IEEE Acoustics, Speech and Signal Processing Magazine, pp. 4-24, Apr. 1998.
G. Burel, "Blind separation of sources: A nonlinear neural algorithm," Neural Networks, 5(6):937-947, 1992.
Griffiths, L. et al. "An Alternative Approach To Linearly Constrained Adaptive Beamforming." IEEE Transactions on Antennas and Propagation, vol. AP-30(1):27-34. Jan. 1982.
J. B. Maj, J. Wouters and M. Moonen, "A two-stage adaptive beamformer for noise reduction in hearing aids," International Workshop on Acoustic Echo and Noise Control (IWAENC), pp. 171-174, Sep. 10-13, 2001, Darmstadt, Germany.
Kuan-Chieh Yen et al: "Lattice-ladder decorrelation filters developed for co-channel speech separation", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY : IEEE, US, vol. 1,May 7, 2001, pp. 637-640, XP010802803, DOI: DOI:10.1109/ICASSP.2001.940912 ISBN: 978-0-7803-7041-8.
Kuan-Chieh Yen et al: "Lattice-ladder structured adaptive decorrelation filtering for co-channel speech separation", Acoustics, Speech, and Signal Processing, 2000. ICASSP '00. Proceeding s. 2000 IEEE International Conference on Jun. 5-9, 2000, Piscataway, NJ, USA,IEEE, vol. 1,Jun. 5, 2000, pp. 388-391, XP010507350, ISBN: 978-0-7803-6293-2.
M. I. Skolnik, Introduction to Radar Systems, McGraw-Hill, New York, 1980.
N. Owsley, in Array Signal Processing, S. Haykin ed., Prentice-Hall, Englewood Cliffs, New Jersey, 1985.
O. L. Frost, "An algorithm for linearly constrained adaptive array processing," Proc. IEEE, vol. 60, No. 8, pp. 926-935, Aug. 1972.
P. M. Peterson, N. I. Durlach, W. M. Rabinowitz and P. M. Zurek, "Multimicrophone adaptive beamforming for interference reduction in hearing aids," Journal of Rehabilitation R&D, vol. 24, Fall 1987.
Pan, Qiongfeng; Aboulnasr, Tyseer: "Combined Spatiau Beamforming and Time/Frequency Processing for Blind Source Separation"!3. European Signal Processing Conference, 4.-8.9. 2005, Antalya Sep. 8, 2005, Retrieved from the Internet:URL:http://www.eurasip.org/Proceedings/Eusipco/Eusipco2005/defevent/papers/cr1353.pdf [retrieved on Jun. 4, 2009].
R. T. Compton, Jr., "An adaptive array in spread spectrum communication system," Proc. IEEE, vol. 66, pp. 289-298, Mar. 1978.
Anand, K. et al.: "Blind Separation of Multiple Co-Channel BPSK Signals Arriving at an Antenna Array," IEEE Signal Processing Letters 2 (9), pp. 176-178, 1995.
Bell, A. et al.: "An Information-Maximization Approach to Blind Separation and Blind Deconvolution," Howard Hughes Medical Institute. Computational Neurobiology Laboratory, The Salk Institute, 10010 N. Torrey Pines Road, La Jolla, CA 92037 USA and Department of Biology, University of California, San Diego, La Jolla, CA 92093 USA, 1995.
Benesty, J. et al.: "Advances in Network and Acoustic Echo Cancellation," pp. 153-154, Springer, New York, 2001.
Breining, C. et al.: "Acoustic Echo Control An Application of Very-High-Order Adaptive Filters," IEEE Signal Processing Magazine 16 (4), pp. 42-69, 1999.
Cardoso, J.F.: "Blind Signal Separation: Statistical Principles," ENST/CNRS 75634 Paris Cedex 13, France, Proceedings of the IEEE, vol. 86, No. 10, Oct. 1998.
Cardoso, J.F.: "Source Separation Using Higher Order Moments," Ecole Nat. Sup. Des Telecommunications-Dept Signal 46 rue Barrault, 75634 Paris Cedex 13, France and CNRS-URS 820, GRECO-TDSI, ICASSP, IEEE International Conference on Acoustics, Speech and Signal Processing—Proceedings 4, pp. 2109-2112, 1989.
Cardoso, J.F.: "The Invariant Approach to Source Separation," ENST/CNRS/GdR TdSI 46 Rue Barrault, 75634 Paris, France, 1995 International Symposium on Nonlinear Theory and Its Applications (NOLTA '95) Las Vegas, U.S.A., Dec. 10-14, 1995.
Choi, S. et al.: "Blind Source Separation and Independent Component Analysis: A Review," Neural Information Processing—Letters and Reviews, vol. 6, No. 1 Jan. 2005.
Comon, P.: "Independent Component Analysis, A New Concept?," Thomson-Sintra, Parc Sophia Antipolis, BP 138, F-06561 Valbonne Cedex, France, Signal Processing 36 (1994) 287-314, 1994.
deLathauwer, L. et al.: "Fetal Electrocardiogram Extraction by Source Subspace Separation," Proceedings, IEEE SP/Athos Workshop on Higher-Order Statistics, Jun. 12-14, 1995 Girona, Spain, pp. 134-138. Aug. 1994.
Eatwell, G.: "Single-Channel Speech Enhancement" in Noise Reduction in Speech Applications, Davis, G. pp. 155-178, CRC Press, 2002.

(56) References Cited

OTHER PUBLICATIONS

Ehlers, F. et al.: "Blind Separation of Convolutive Mixtures and an Application in Automatic Speech Recognition in a Noisy Environment," IEEE Transactions on Signal Processing, vol. 45, No. 10, Oct. 1997.
Gabrea, M. et al.: "Two Microphones Speech Enhancement System Based on a Double Fast Recursive Least Squares (DFRLS) Algorithm," Equipe Signal et Image, ENSERB and GDR-134, CNRS, BP 99, 33 402 Talence, France, LASSY-13S Nice, France, Texas-Instruments, Villenueve-Loubet, France, 1996.
Girolami, M.: "Noise Reduction and Speech Enhancement via Temporal Anti-Hebbian Learning," Department of Computing and Information Systems, The University of Paisley, Paisley, PA1 2BE, Scotland, 1998.
Girolami, M.: "Symmetric Adaptive Maximum Likelihood Estimation for Noise Cancellation and Signal Separation," Electronics Letters 33 (17), pp. 1437-1438, 1997.
Hansler, E.: "Adaptive Echo Compensation Applied to the Hands-Free Telephone Problem," Institut fur Netzwerk-und Signaltheorie, Technische Hochschule Darmstadt, Merckstrasse 25, D-6100 Darmstadt, FRG,Proceedings—IEEE International Symposium on Circuits and Systems 1, pp. 279-282, 1990.
Heitkamper, P. et al.: "Adaptive Gain Control for Speech Quality Improvement and Echo Suppression," Proceedings—IEEE International Symposium on Circuits and Systems 1, pp. 455-458, 1993.
Jutten, C. et al.: "Blind Separation of Sources, Part I: An Adaptive Algorithm based on Neuromimetic Architecture," INPG-Lab, TIRF, 46, Avenue Felix Viallet, F-38031 Grenoble Cedex, France, Signal Processing 24 (1991) 1-10.
Jutten, C. et al.: "Independent Component Analysis versus Principal Components Analysis," Signal Processing IV: Theo, and Appl. Elsevier Publishers, pp. 643-646, 1988.
Makeig, S. et al.: "Independent Component Analysis of Electroencephalographic Data," Proceedings of the Advances in Neural Information Processing Systems 8, MIT Press, 1995.
Nguyen, L. et al.: "Blind Source Separation for Convolutive Mixtures, Signal Processing," Signal Processing, 45 (2):209-229, 1995.
Sattar, F. et al.: "Blind Source Separation of Audio Signals Using Improved ICA Method," School of EEE, Nanyang Technological University, Nanyang Avenue, Singapore 639798, IEEE Workshop on Statistical Signal Processing Proceedings, pp. 452-455, 2001.
Tahernezhadi, M. et al.: "Acoustic Echo Cancellation Using Subband Technique for Teleconferencing Applications," Department of Electrical Engineering Northern Illinois University DeKalb, IL 60115, 1994.
Tong. L. et al.: "Indeterminacy and Identifiability of Blind Identification," IEEE transactions on circuits and systems 38 (5), pp. 499-509, 1991.
Torkkola, K.: "Blind Separation of Convolved Sources Based on Information Maximization," Mortorola, Inc., Phoenix Corporate Research Laboratories, 2100 E. Elliot Rd. MD EL508, Tempe AZ 85284, USA, Proceedings of the International Joint Conference on Neura, 1996.
Widrow, B. et al.: "Adaptive Noise Cancelling: Principles and Applications," Proceedings of the IEEE 63 (12), pp. 1692-1716, 1975.
Wouters, J. et al.: "Speech Intelligibility in Noise Environments with One- and Two-Microphone Hearing Aids," University of Leuven/K. U.Leuven, Lab. Exp. ORL, Kapucijnenvoer 33, B-3000 Leuven, Belgium, Audiology 38 (2), pp. 91-98, 1999.
Xi, J. et al.: "Blind Separation and Restoration of Signals Mixed in Convolutive Environment," The Communications Research Laboratory, McMaster University Hamilton, Ontario, Canada L8S 4K1, ICASSP, IEEE International Conference on Acoustics, Speech and Signal Processing—Proceedings 2, pp. 1327-1330, 1997.
Yasukawa, H. et al.: "An Acoustic Echo Canceller Using Subband Sampling and Decorrelation Methods," IEEE Transactions on Signal Processing, vol. 41, No. 2, Feb. 1993.
Yellin, D. et al.: "Criteria for Multichannel Signal Separation," IEEE Transactions on Signal Processing, vol. 42, No. 8, Aug. 1994.
Visser, et al., "A Spatio-temporal Speech Enhancement for Robust Speech Recognition in Noisy Environments," Speech Communication, vol. 41, 2003, pp. 393-407.
Taiwan Search Report—TW097136965—TIPO—Apr. 16, 2012.

* cited by examiner

MULTIPLE MICROPHONE VOICE ACTIVITY DETECTOR

CROSS-RELATED APPLICATIONS

This application relates to co-pending application "Enhancement Techniques for Blind Source Separation", commonly assigned U.S. patent application Ser. No. 11/551,509, filed Oct. 20, 2006, and co-pending application "Apparatus and Method of Noise and Echo Reduction in Multiple Microphone Audio Systems" Ser. No. 11/864,906 co-filed with this application.

FIELD OF THE INVENTION

The disclosure relates to the field of audio processing. In particular, the disclosure relates to voice activity detection using multiple microphones.

BACKGROUND

Description of Related Art

Signal activity detectors, such as voice activity detectors, can be used to minimize the amount of unnecessary processing in an electronic device. The voice activity detector may selectively control one or more signal processing stages following a microphone.

For example, a recording device may implement a voice activity detector to minimize processing and recording of noise signals. The voice activity detector may de-energize or otherwise deactivate signal processing and recording during periods of no voice activity. Similarly, a communication device, such as a mobile telephone, Personal-Device Assistant, or laptop, may implement a voice activity detector in order to reduce the processing power allocated to noise signals and to reduce the noise signals that are transmitted or otherwise communicated to a remote destination device. The voice activity detector may de-energize or deactivate voice processing and transmission during periods of no voice activity.

The ability of the voice activity detector to operate satisfactorily may be impeded by changing noise conditions and noise conditions having significant noise energy. The performance of a voice activity detector may be further complicated when voice activity detection is integrated in a mobile device, which is subject to a dynamic noise environment. A mobile device can operate under relatively noise free environments or can operate under substantial noise conditions, where the noise energy is on the order of the voice energy.

The presence of a dynamic noise environment complicates the voice activity decision. The erroneous indication of voice activity can result in processing and transmission of noise signals. The processing and transmission of noise signals can create a poor user experience, particularly where periods of noise transmission are interspersed with periods of inactivity due to an indication of a lack of voice activity by the voice activity detector.

Conversely, poor voice activity detection can result in the loss of substantial portions of voice signals. The loss of initial portions of voice activity can result in a user needing to regularly repeat portions of a conversation, which is an undesirable condition.

Traditional Voice Activity Detection (VAD) algorithms use only one microphone signal. Early VAD algorithms use energy based criteria. This type of algorithm estimates a threshold to make decision on voice activity. Single microphone VAD can work well for stationary noise. However, single microphone VAD has some difficulty dealing with non-stationary noise.

Another VAD technique counts zero-crossing of signals and makes a voice activity decision based on the rate of zero-crossing. This method can work fine when background noise is non-speech signals. When the background signal is speech like signal, this method fails to make reliable decision. Other features, such as pitch, formant shape, cepstrum and periodicity can also be used for voice activity detection. These features are detected and compared to the speech signal to make a voice activity decision.

Instead of using speech features, statistical models of speech presence and speech absence can also be used to make a voice activity decision. In such implementations, the statistical models are updated and voice activity decision is made based on likelihood ratio of the statistical models. Another method uses a single microphone source separation network to pre-process the signal. The decision is made using smoothened error signal of Lagrange programming neural networks and an activity adapted threshold.

VAD algorithms based on multiple microphones have also been studied. Multiple microphone embodiments may combine noise suppression, threshold adaptation and pitch detection to achieve robust detection. An embodiment uses linear filtering to maximize a signal-to-interference-ratio (SIR). Then, a statistical model based method is used to detect voice activity using the enhanced signal. Another embodiment uses a linear microphone array and Fourier transforms to generate a frequency domain representation of the array output vector. The frequency domain representations may be used to estimate a signal-to-noise-ratio (SNR) and a pre-determined threshold may be used to detect speech activity. Yet another embodiment suggests using magnitude square coherence (MSC) and an adaptive threshold to detect voice activity in a two-sensor based VAD method.

Many of the voice activity detection algorithms are computationally expensive and are not suitable for mobile applications, where power consumption and computational complexity is of concern. However, mobile applications also present challenging voice activity detection environments due in part to the dynamic noise environment and non-stationary nature of the noise signals incident on a mobile device.

BRIEF SUMMARY

Voice activity detection using multiple microphones can be based on a relationship between energy at each of a speech reference microphone and a noise reference microphone. The energy output from each of the speech reference microphone and the noise reference microphone can be determined. A speech to noise energy ratio can be determined and compared to a predetermined voice activity threshold. In another embodiment, the absolute value of the correlation of the speech and autocorrelation and/or absolute value of the autocorrelation of the noise reference signals are determined and a ratio based on the correlation values is determined. Ratios that exceed the predetermined threshold can indicate the presence of a voice signal. The speech and noise energies or correlations can be determined using a weighted average or over a discrete frame size.

Aspects of the invention include a method of detecting voice activity. The method includes receiving a speech reference signal from a speech reference microphone, receiving a noise reference signal from a noise reference microphone distinct from the speech reference microphone, determining a speech characteristic value based at least in part on the speech reference signal, determining a combined characteristic value based at least in part on the speech reference signal and the noise reference signal, determining a voice activity metric based at least in part on the speech characteristic value and the combined characteristic value, and determining a voice activity state based on the voice activity metric.

Aspects of the invention include a method of detecting voice activity. The method includes receiving a speech reference signal from at least one speech reference microphone, receiving a noise reference signal from at least one noise reference microphone distinct from the speech reference microphone, determining an absolute value of the autocorrelation based on the speech reference signal, determining a cross correlation based on the speech reference signal and the noise reference signal, determining a voice activity metric based in part on a ratio of the absolute value of the autocorrelation of the speech reference signal to the cross correlation, and determining a voice activity state by comparing the voice activity metric to at least one threshold.

Aspects of the invention include an apparatus configured to detect voice activity. The apparatus includes a speech reference microphone configured to output a speech reference signal, a noise reference microphone configured to output a noise reference signal, a speech characteristic value generator coupled to the speech reference microphone and configured to determine a speech characteristic value, a combined characteristic value generator coupled to the speech reference microphone and the noise reference microphone and configured to determine a combined characteristic value, a voice activity metric module configured to determine a voice activity metric based at least in part on the speech characteristic value and the combined characteristic value, and a comparator configured to compare the voice activity metric against a threshold and output a voice activity state.

Aspects of the invention include an apparatus configured to detect voice activity. The apparatus includes means for receiving a speech reference signal, means for receiving a noise reference signal, means for determining an absolute value of the autocorrelation based on the speech reference signal, means for determining a cross correlation based on the speech reference signal and the noise reference signal, means for determining a voice activity metric based in part on a ratio of the autocorrelation of the speech reference signal to the cross correlation, and means for determining a voice activity state by comparing the voice activity metric to at least one threshold.

Aspects of the invention include processor readable media including instructions that may be utilized by one or more processors. The instructions include instructions for determining a speech characteristic value based at least in part on a speech reference signal from at least one speech reference microphone, instructions for determining a combined characteristic value based at least in part on the speech reference signal and a noise reference signal from at least one noise reference microphone, instructions for determining a voice activity metric based at least in part on the speech characteristic value and the combined characteristic value, and instructions for determining a voice activity state based on the voice activity metric.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Apparatus and methods for Voice Activity Detection (VAD) using multiple microphones are disclosed. The apparatus and methods utilize a first set or group of microphones configured in substantially a near field of a mouth reference point (MRP), where the MRP is considered the position of the signal source. A second set or group of microphones may be configured in substantially a reduced voice location. Ideally, the second set of microphones are positioned in substantially the same noise environment as the first set of microphones, but couple substantially none of the speech signals. Some mobile devices do not permit this optimal configuration, but rather permit a configuration where the speech received in the first set of microphones is consistently greater than speech received by the second set of microphones.

The first set of microphones receive and convert a speech signal that is typically of better quality relative to the second set of microphones. As such, the first set of microphones can be considered speech reference microphones and the second set of microphones can be considered noise reference microphones.

A VAD module can initially determine a characteristic based on the signals at each of the speech reference microphones and noise reference microphones. The characteristic values corresponding to the speech reference microphones and noise reference microphones are used to make the voice activity decision.

For example, a VAD module can be configured to compute, estimate, or otherwise determine the energies of each of the signals from the speech reference microphones and noise reference microphones. The energies can be computed at predetermined speech and noise sample times or can be computed based on a frame of speech and noise samples.

In another example, the VAD module can be configured to determine an autocorrelation of the signals at each of the speech reference microphones and noise reference microphones. The autocorrelation values can correspond to a predetermined sample time or can be computed over a predetermined frame interval.

The VAD module can compute or otherwise determine an activity metric based at least in part on a ratio of the characteristic values. In one embodiment, the VAD module is configured to determine a ratio of energy from the speech reference microphones relative to the energy from the noise reference microphones. The VAD module can be configured to determine a ratio of autocorrelation from the speech reference microphones relative to the autocorrelation from the noise reference microphones. In another embodiment, the square root of one of the previous described ratios is used as the activity metric. The VAD compares the activity metric against a predetermined threshold to determine the presence or absence of voice activity.

Figure 1:
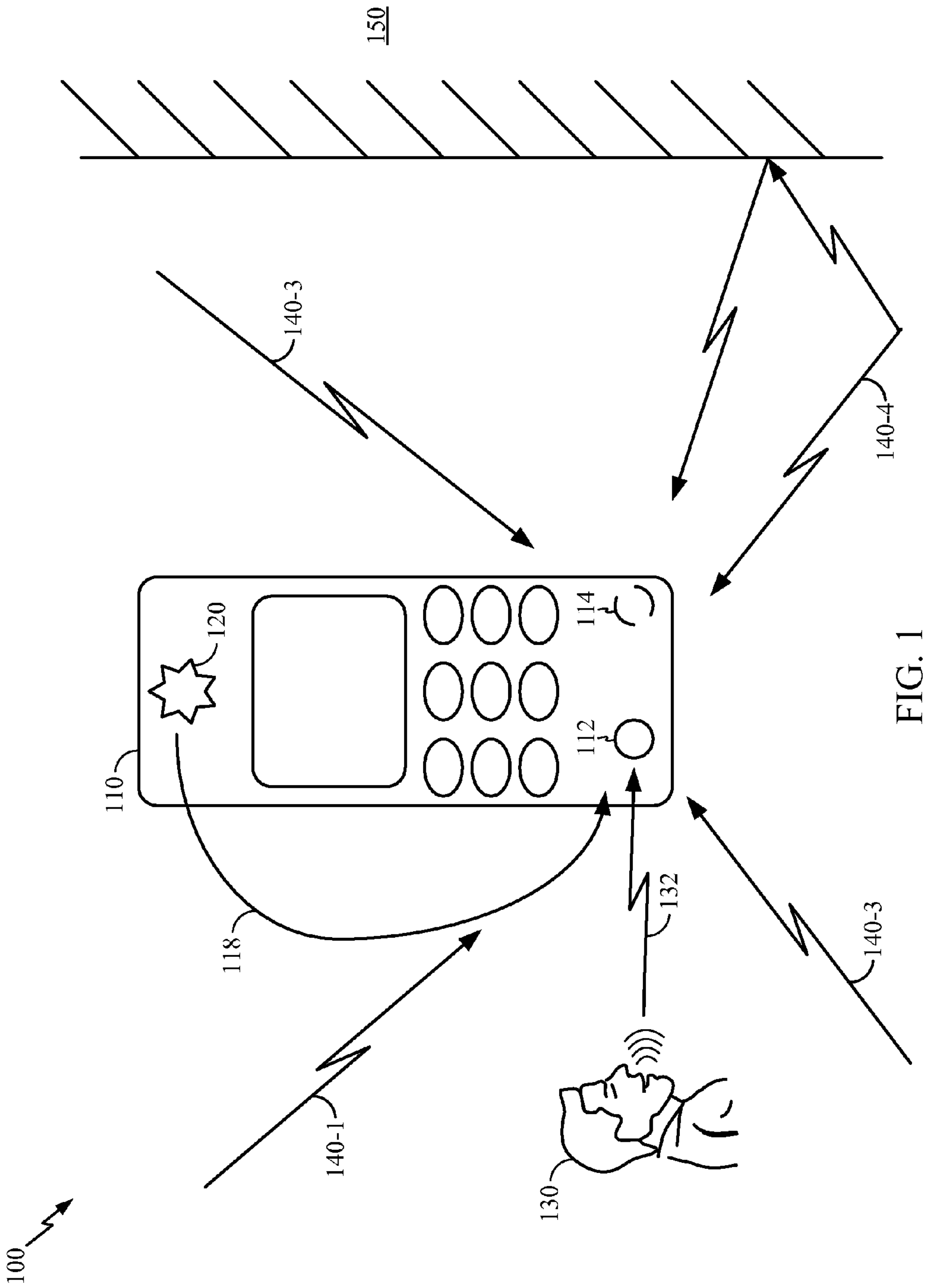
FIG. 1 is a simplified functional block diagram of a multiple microphone device operating in a noise environment.

FIG. 1 is a simplified functional block diagram of an operating environment 100 including a multiple microphone mobile device 110 having voice activity detection. Although described in the context of a mobile device, it is apparent that the voice activity detection methods and apparatus disclosed herein are not limited to application in mobile devices, but can be implemented in stationary devices, portable devices, mobile devices, and may operate while the host device is mobile or stationary.

The operating environment 100 depicts a multiple microphone mobile device 110. The multiple microphone device includes at least one speech reference microphone 112, here depicted on a front face of the mobile device 110, and at least one noise reference microphone 114, here depicted on a side of the mobile device 110 opposite the speech reference microphone 112.

Although the mobile device 110 of FIG. 1, and generally, the embodiments shown in the figures, depicts one speech reference microphone 112 and one noise reference microphone 114, the mobile device 110 can implement a speech reference microphone group and a noise reference microphone group. Each of the speech reference microphone group and the noise reference microphone group can include one or more microphones. The speech reference microphone group can include a number of microphones that are distinct or the same as the number of microphones in the noise reference microphone group.

Additionally, the microphones of the speech reference microphone group are typically exclusive of the microphones in the noise reference microphone group, but this is not an absolute limitation, as one or more microphones may be shared among the two microphone groups. However, the union of the speech reference microphone group with the noise reference microphone group includes at least two microphones.

The speech reference microphone 112 is depicted as being on a surface of the mobile device 110 that is generally opposite the surface having the noise reference microphone 114. The placement of the speech reference microphone 112 and noise reference microphone 114 are not limited to any physical orientation. The placement of the microphones is typically governed by the ability to isolate speech signals from the noise reference microphone 114.

In general, the microphones of the two microphone groups are mounted at different locations on the mobile device 110. Each microphone receives its own version of combination of desired speech and background noise. The speech signal can be assumed to be from near-field sources. The sound pressure level (SPL) at the two microphone groups can be different depending on the location of the microphones. If one microphone is closer to the mouth reference point (MRP) or a speech source 130, it may receive higher SPL than another microphone positioned further from the MRP. The microphone with higher SPL is referred to as the speech reference microphone 112 or the primary microphone, which generates speech reference signal, denoted as $s_{SP}(n)$. The microphone having the reduced SPL from the MRP of the speech source 130 is referred to as the noise reference microphone 114 or the secondary microphone, which generates a noise reference signal, denoted as $s_{NS}(n)$. Note that the speech reference signal typically contains background noise, and the noise reference signal may also contain desired speech.

The mobile device 110 can include voice activity detection, as described in further detail below, to determine the presence of a speech signal from the speech source 130. The operation of voice activity detection may be complicated by the number and distribution of noise sources that may be in the operating environment 100.

Noise incident on the mobile device 110 may have a significant uncorrelated white noise component, but may also include one or more colored noise sources, e.g. 140-1 through 140-4. Additionally, the mobile phone 110 may itself generate interference, for example, in the form of an echo signal that couples from an output transducer 120 to one or both of the speech reference microphone 112 and noise reference microphone 114.

The one or more colored noise sources may generate noise signals that each originate from a distinct location and orientation relative to the mobile device 110. A first noise source 140-1 and a second noise source 140-2 may each be positioned nearer to, or in a more direct path to, the speech reference microphone 112, while third and fourth noise sources 140-3 and 140-4 may be positioned nearer to, or in a more direct path to, the noise reference microphone 114. Additionally, one or more noise sources, e.g. 140-4, may generate a noise signal that reflects off of a surface 150 or that otherwise traverses multiple paths to the mobile device 110.

Although each of the noise sources may contribute a significant signal to the microphones, each of the noise sources 140-1 through 140-4 is typically positioned in the far field, and thus, contributes substantially similar Sound Pressure Levels (SPL) to each of the speech reference microphone 112 and noise reference microphone 114.

The dynamic nature of the magnitude, position, and frequency response associated with each noise signal contributes to the complexity of the voice activity detection process. Additionally, the mobile device 110 is typically battery powered, and thus the power consumption associated with voice activity detection may be a concern.

The mobile device 110 can perform voice activity detection by processing each of the signals from the speech reference microphone 112 and noise reference microphone 114 to generate corresponding speech and noise characteristic values. The mobile device 110 can generate a voice activity metric based in part on the speech and noise characteristic values, and can determine voice activity by comparing the voice activity metric against a threshold value.

Figure 2:
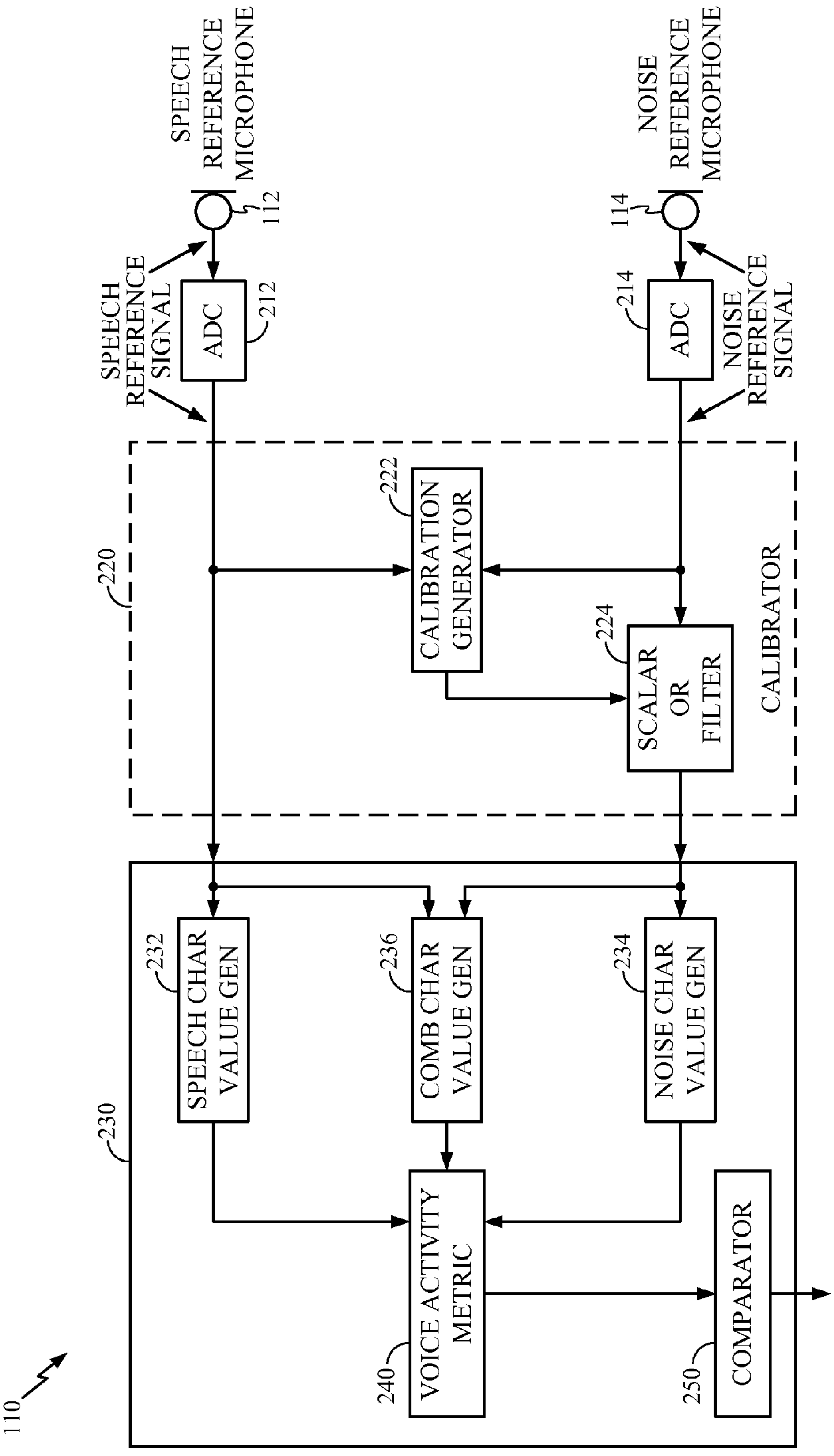
FIG. 2 is a simplified functional block diagram of an embodiment of a mobile device with a calibrated multiple microphone voice activity detector.

FIG. 2 is a simplified functional block diagram of an embodiment of a mobile device 110 with a calibrated multiple microphone voice activity detector. The mobile device 110 includes a speech reference microphone 112, which may be a group of microphones, and a noise reference microphone 114, which may be a group of noise reference microphones.

The output from the speech reference microphone 112 may be coupled to a first Analog to Digital Converter (ADC) 212. Although the mobile device 110 typically implements analog processing of the microphone signals, such as filtering and amplification, the analog processing of the speech signals is not shown for the sake of clarity and brevity.

The output from the noise reference microphone 114 may be coupled to a second ADC 214. The analog processing of the noise reference signals typically may be substantially the same as the analog processing performed on the speech reference signals in order to maintain substantially the same spectral response. However, the spectral response of the analog processing portions does not need to be the same, as a calibrator 220 may provide some correction. Additionally, some or all of the functions of the calibrator 220 may be implemented in the analog processing portions rather than the digital processing shown in FIG. 2.

The first and second ADCs 212 and 214 each convert their respective signals to a digital representation. The digitized output from the first and second ADCs 212 and 214 are coupled to a calibrator 220 that operates to substantially equalize the spectral response of the speech and noise signal paths prior to voice activity detection.

The calibrator 220 includes a calibration generator 222 that is configured to determine a frequency selective correction and control a scalar/filter 224 placed in series with one of the speech signal path or noise signal path. The calibration generator 222 can be configured to control the scalar/filter 224 to provide a fixed calibration response curve, or the calibration generator 222 can be configured to control the scalar/filter 224 to provide a dynamic calibration response curve. The calibration generator 222 can control the scalar/filter 224 to provide a variable calibration response curve based on one or more operating parameters. For example, the calibration generator 222 can include or otherwise access a signal power detector (not shown) and can vary the response of the scalar/filter 224 in response to the speech or noise power. Other embodiments may utilize other parameters or combination of parameters.

The calibrator 220 can be configured to determine the calibration provided by the scalar/filter 224 during a calibration period. The mobile device 110 can be calibrated initially, for example, during manufacture, or can be calibrated according to a calibration schedule that may initiate calibration upon one or more events, times, or combination of events and times. For example, the calibrator 220 may initiate a calibration each time the mobile device powers up, or during power up only if a predetermined time has elapsed since the most recent calibration.

During calibration, the mobile device 110 may be in a condition where it is in the presence of far field sources, and does not experience near field signals at either the speech reference microphone 112 or the noise reference microphone 114. The calibration generator 222 monitors each of the speech signal and the noise signal and determines the relative spectral response. The calibration generator 222 generates or otherwise characterizes a calibration control signal that, when applied to the scalar/filter 224, causes the scalar/filter 224 to compensate for the relative differences in spectral response.

The scalar/filter 224 can introduce amplification, attenuation, filtering, or some other signal processing that can substantially compensate for the spectral differences. The scalar/filter 224 is depicted as being placed in the path of the noise signal, which may be convenient to prevent the scalar/filter from distorting the speech signals. However, portions or all of the scalar/filter 224 can be placed in the speech signal path, and may be distributed across the analog and digital signal paths of one or both of the speech signal path and noise signal path.

The calibrator 220 couples the calibrated speech and noise signals to respective inputs of a voice activity detection (VAD) module 230. The VAD module 230 includes a speech characteristic value generator 232, a noise characteristic value generator 234, a voice activity metric module 240 operating on the speech and noise characteristic values, and a comparator 250 configured to determine the presence or absence of voice activity based on the voice activity metric. The VAD module 230 may optionally include a combined characteristic value generator 236 configured to generate a characteristic based on a combination of both the speech reference signal and the noise reference signal. For example, the combined characteristic value generator 236 can be configured to determine a cross correlation of the speech and noise signals. The absolute value of the cross correlation may be taken, or the components of the cross correlation may be squared.

The speech characteristic value generator 232 may be configured to generate a value that is based at least in part on the speech signal. The speech characteristic value generator 232 can be configured, for example, to generate a characteristic value such as an energy of the speech signal at a specific sample time ($E_{SP}(n)$), an autocorrelation of the speech signal at a specific sample time ($\rho_{SP}(n)$), or some other signal characteristic value, like the absolute value of the autocorrelation of the speech signal or the components of the auto correlation may be taken.

The noise characteristic value generator 234 may be configured to generate a complementary noise characteristic value. That is, the noise characteristic value generator 234 may be configured to generate a noise energy value at a specific time ($E_{NS}(n)$) if the speech characteristic value generator 232 generates a speech energy value. Similarly, the noise characteristic value generator 234 may be configured to generate a noise autocorrelation value at a specific time ($\rho_{NS}(n)$) if the speech characteristic value generator 232 generates a speech autocorrelation value. The absolute value of the noise autocorrelation value may also be taken, or the components of the noise autocorrelation value may be taken.

The voice activity metric module 240 may be configured to generate a voice activity metric based on the speech characteristic value, noise characteristic value, and optionally, the cross correlation value. The voice activity metric module 240 can be configured, for example, to generate a voice activity metric that is not computationally complex. The VAD module 230 is thus able to generate a voice activity detection signal in substantially real time, and using relatively few processing resources. In one embodiment, the voice activity metric module 240 is configured to determine a ratio of one or more of the characteristic values or a ratio of one or more of the characteristic values and the cross correlation value or a ratio of one or more of the characteristic values and the absolute value of the cross correlation value.

The voice activity metric module 240 couples the metric to a comparator 250 that can be configured to determine presence of speech activity by comparing the voice activity metric against one or more thresholds. Each of the thresholds can be a fixed, predetermined threshold, or one or more of the thresholds can be a dynamic threshold.

In one embodiment, the VAD module 230 determines three distinct correlations to determine speech activity. The speech characteristic value generator 232 generates an auto-correlation of the speech reference signal $\rho_{SP}(n)$, the noise characteristic value generator 234 generates an auto-correlation of the noise reference signal $\rho_{NS}(n)$ and the cross correlation module 236 generates the cross-correlation of absolute values of the speech reference signal and noise reference signal $\rho_C(n)$. Here n represents a time index. In order to avoid excessive delay, the correlations can be approximately computed using an exponential window method using the following equations. For auto-correlation, the equation is:

$$\rho(n)=\alpha\rho(n-1)+s(n)^2 \text{ or } \rho(n)=\alpha\rho(n-1)+(1-\alpha)s(n)^2.$$

For cross-correlation, the equation is:

$$\rho_C(n)=\alpha\rho_C(n-1)+|s_{SP}(n)s_{NS}(n)| \text{ or } \rho_C(n)=\alpha\rho_C(n-1)+(1-\alpha)|s_{SP}(n)s_{NS}(n)|.$$

In the above equations, $\rho(n)$ is correlation at time n. s(n) is one of the speech or noise microphone signals at time n. $\alpha$ is a constant between 0 and 1. $|\bullet|$ represents the absolute value. The correlation can also be computed using a square window of window size N as follows:

$$\rho(n)=\rho(n-1)+s(n)^2-s(n-N)^2 \text{ or}$$

$$\rho_C(n)=\rho_C(n-1)+|s_{SP}(n)s_{NS}(n)|-|s_{SP}(n-N)s_{NS}(n-N)|.$$

The VAD decision can be made based on $\rho_{SP}(n)$, $\rho_{NS}(n)$ and $\rho_C(n)$. Generally, $$D(n)=vad(\rho_{SP}(n),\rho_{NS}(n),\rho_C(n)).$$

In the following examples, two categories of the VAD decision are described. One is a sample-based VAD decision method. The other is a frame-based VAD decision method. In general, the VAD decision methods that are based on using the absolute value of the autocorrelation or cross correlation may allow for a smaller dynamic range of the cross correlation or autocorrelation. The reduction in the dynamic range may allow for more stable transitions in the VAD decision methods.

Sample Based VAD Decision

The VAD module can make a VAD decision for each pair of speech and noise samples at time n based on the correlations computed at time n. As an example, the voice activity metric module can be configured to determine voice activity metric based on a relationship among the three correlation values.

$$R(n)=f(\rho_{SP}(n),\rho_{NS}(n),\rho_C(n)).$$

A quantity T(n) can be determined based on $\rho_{SP}(n)$, $\rho_{NS}(n)$, $\rho_C(n)$ and R(n), e.g.

$$T(n)=g(\rho_{SP}(n),\rho_{NS}(n),\rho_C(n),R(n)).$$

The comparator can make the VAD decision based on R(n) and T(n), e.g.

$$D(n)=vad(R(n),T(n)).$$

As a specific example, the voice activity metric R(n) can be defined to be the ratio between the speech autocorrelation value $\rho_{SP}(n)$ from the speech characteristic value generator 232 and the cross correlation $\beta_C(n)$ from the cross correlation module 236. At time n, the voice activity metric can be the ratio defined to be:

$$R(n) = \frac{\rho_{SP}(n)}{\rho_C(n) + \delta},$$

In the above example of the voice activity metric, the voice activity metric module 240 bounds the value. The voice activity metric module 240 bounds the value by bounding the denominator to no less than $\delta$, where $\delta$ is a small positive number to avoid division by zero. As another example, R(n) can be defined to be the ratio between $\rho_C(n)$ and $\rho_{NS}(n)$, e.g.

$$R(n) = \frac{\rho_C(n)}{\rho_{NS}(n) + \delta}.$$

As a specific example, the quantity T(n) may be a fixed threshold. Let $R_{SP}(n)$ be the minimum ratio when desired speech is present until time n. Let $R_{NS}(n)$ be the maximum ratio when desired speech is absent until time n. The threshold T(n) can be determined or otherwise selected to be between $R_{NS}(n)$ and $R_{SP}(n)$, or equivalently:

$$R_{NS}(n)\le Th(n)\le R_{SP}(n).$$

The threshold can also be variable and can vary based at least in part on the change of desired speech and background noise. In such case, $R_{SP}(n)$ and $R_{NS}(n)$ can be determined based on the most recent microphone signals.

The comparator 250 compares the threshold against the voice activity metric, here the ratio R(n), to make a decision on voice activity. In this specific example, the decision making function vad(•, •) may be defined as follows $$vad(R(n), T(n)) = \begin{cases} \text{Active} & R(n) > T(n) \\ \text{Inactive} & \text{otherwise.} \end{cases}$$

Frame Based VAD Decision

The VAD decision can also be made such that a whole frame of samples generate and share one VAD decision. The frame of samples can be generated or otherwise received between time m and time m+M−1, where M represents the frame size.

As an example, the speech characteristic value generator 232, the noise characteristic value generator 234, and the combined characteristic value generator 236 can determine the correlations for a whole frame of data. Compared to the correlations computed using square window, the frame correlation is equivalent to the correlation computed at time m+M−1, e.g. p(m+M−1).

The VAD decision can be made based on the energy or autocorrelation values of the two microphone signals. Similarly, the voice activity metric module 240 can determine the activity metric based on a relationship R(n) as described above in the sample-based embodiment. The comparator can base the voice activity decision based on a threshold T(n).

VAD Based on Signals after Signal Enhancement

When SNR of the speech reference signal is low, the VAD decision tends to be aggressive. The onset and offset part of the speech may be classified to be non-speech segment. If the signal levels from the speech reference microphone and the noise reference microphone are similar when the desired speech signal is present, the VAD apparatus and methods described above may not provide a reliable VAD decision. In such cases, additional signal enhancement may be applied to one or more of the microphone signals to assist the VAD to make reliable decision.

Signal enhancement can be implemented to reduce the amount of background noise in the speech reference signal without changing the desired speech signal. Signal enhancement may also be implemented to reduce the level or amount of speech in the noise reference signal without changing background noise. In some embodiments, signal enhancement may perform a combination of speech reference enhancement and noise reference enhancement.

Figure 3:
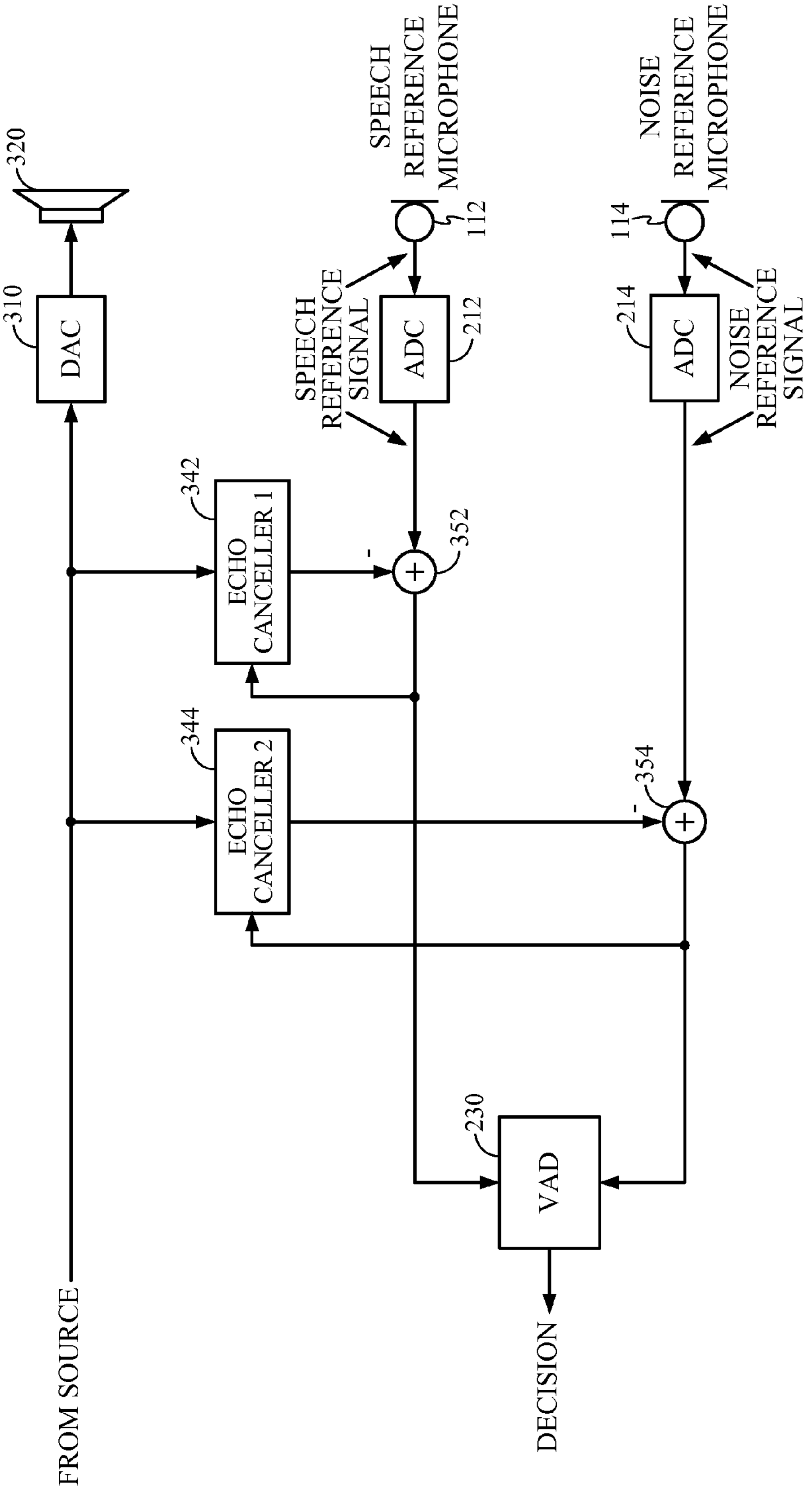
FIG. 3 is a simplified functional block diagram of an embodiment of mobile device with a voice activity detector and echo cancellation.

FIG. 3 is a simplified functional block diagram of an embodiment of mobile device 110 with a voice activity detector and echo cancellation. The mobile device 110 is depicted without the calibrator shown in FIG. 2, but implementation of echo cancellation in the mobile device 110 is not exclusive of calibration. Furthermore, the mobile device 110 implements echo cancellation in the digital domain, but some or all of the echo cancellation may be performed in the analog domain.

The voice processing portion of the mobile device 110 may be substantially similar to the portion illustrated in FIG. 2. A speech reference microphone 112 or group of microphones receives a speech signal and converts the SPL from the audio signal to an electrical speech reference signal. The first ADC 212 converts the analog speech reference signal to a digital representation. The first ADC 212 couples the digitized speech reference signal to a first input of a first combiner 352.

Similarly, a noise reference microphone 114 or group of microphones receives the noise signals and generates a noise reference signal. The second ADC 214 converts the analog noise reference signal to a digital representation. The second ADC 214 couples the digitized noise reference signal to a first input of a second combiner 354.

The first and second combiners 352 and 354 may be part of an echo cancellation portion of the mobile device 110. The first and second combiners 352 and 354 can be, for example, signal summers, signal subtractors, couplers, modulators, and the like, or some other device configured to combine signals.

The mobile device 110 can implement echo cancellation to effectively remove the echo signal attributable to the audio output from the mobile device 110. The mobile device 110 includes an output digital to analog converter (DAC) 310 that receives a digitized audio output signal from a signal source (not shown) such as a baseband processor and converts the digitized audio signal to an analog representation. The output of the DAC 310 may be coupled to an output transducer, such as a speaker 320. The speaker 320, which can be a receiver or a loudspeaker, may be configured to convert the analog signal to an audio signal. The mobile device 110 can implement one or more audio processing stages between the DAC 310 and the speaker 320. However, the output signal processing stages are not illustrated for the purposes of brevity.

The digital output signal may be also coupled to inputs of a first echo canceller 342 and a second echo canceller 344. The first echo canceller 342 may be configured to generate an echo cancellation signal that is applied to the speech reference signal, while the second echo canceller 344 may be configured to generate an echo cancellation signal that is applied to the noise reference signal.

The output of the first echo canceller 342 may be coupled to a second input of the first combiner 342. The output of the second echo canceller 344 may be coupled to a second input of the second combiner 344. The combiners 352 and 354 couple the combined signals to the VAD module 230. The VAD module 230 can be configured to operate in a manner described in relation to FIG. 2.

Each of the echo cancellers 342 and 344 may be configured to generate an echo cancellation signal that reduces or substantially eliminates the echo signal in the respective signal lines. Each echo canceller 342 and 344 can include an input that samples or otherwise monitors the echo cancelled signal at the output of the respective combiners 352 and 354. The output from the combiners 352 and 354 operates as an error feedback signal that can be used by the respective echo cancellers 342 and 344 to minimize the residual echo.

Each echo canceller 342 and 344 can include, for example, amplifiers, attenuators, filters, delay modules, or some combination thereof to generate the echo cancellation signal. The high correlation between the output signal and the echo signal may permit the echo cancellers 342 and 344 to more easily detect and compensate for the echo signal.

In other embodiments, additional signal enhancement may be desirable because the assumption that the speech reference microphones are placed closer to the mouth reference point does not hold. For example, the two microphones can be placed so close to each other that the difference between the two microphone signals is very small. In this case, unenhanced signals may fail to produce a reliable VAD decision. In this case, signal enhancement can be used to help improve the VAD decision.

Figure 4B:
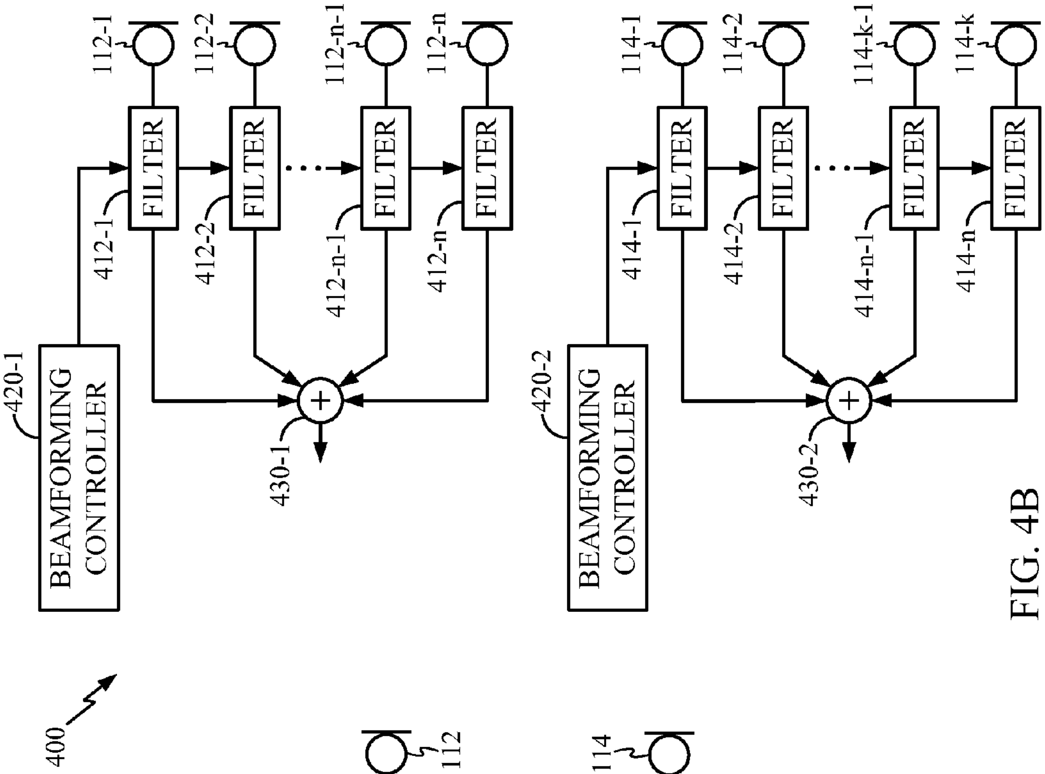
FIG. 4B is a simplified functional block diagram of signal enhancement using beamforming.
Figure 4A:
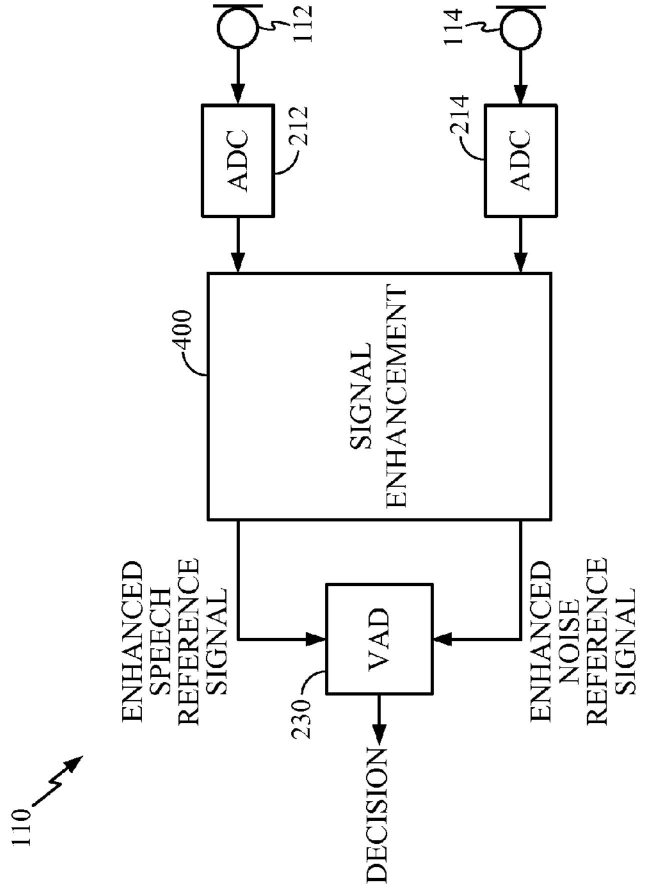
FIG. 4A is a simplified functional block diagram of an embodiment of mobile device with a voice activity detector with signal enhancement.

FIG. 4 is a simplified functional block diagram of an embodiment of mobile device 110 with a voice activity detector with signal enhancement. As before, one or both of the calibration and echo cancellation techniques and apparatus described above in relation to FIGS. 2 and 3 can be implemented in addition to signal enhancement.

The mobile device 110 includes a speech reference microphone 112 or group of microphones configured to receive a speech signal and convert the SPL from the audio signal to an electrical speech reference signal. The first ADC 212 converts the analog speech reference signal to a digital representation. The first ADC 212 couples the digitized speech reference signal to a first input of a signal enhancement module 400.

Similarly, a noise reference microphone 114 or group of microphones receives the noise signals and generates a noise reference signal. The second ADC 214 converts the analog noise reference signal to a digital representation. The second ADC 214 couples the digitized noise reference signal to a second input of the signal enhancement module 400.

The signal enhancement module 400 may be configured to generate an enhanced speech reference signal and an enhanced noise reference signal. The signal enhancement module 400 couples the enhanced speech and noise reference signals to a VAD module 230. The VAD module 230 operates on the enhanced speech and noise reference signals to make the voice activity decision.

VAD Based on Signals after Beamforming or Signal Separation

The signal enhancement module 400 can be configured to implement adaptive beamforming to produce sensor directivity. The signal enhancement module 400 implements adaptive beamforming using a set of filters and treating the microphones as an array of sensors. This sensor directivity can be used to extract a desired signal when multiple signal sources are present. Many beamforming algorithms are available to achieve sensor directivity. An instantiation of a beamforming algorithm or a combination of beamforming algorithms is referred to as a beamformer. In two-microphone speech communications, the beamformer can be used to direct the sensor direction to the mouth reference point to generate enhanced speech reference signal in which background noise may be reduced. It may also generate enhanced noise reference signal in which the desired speech may be reduced.

FIG. 4B is a simplified functional block diagram of an embodiment of a signal enhancement module 400 beamforming the speech and noise reference microphones 112 and 114.

The signal enhancement module 400 includes a set of speech reference microphones 112-1 through **112-*n* comprising a first array of microphones. Each of the speech reference microphones 112-1 through 112-*n* may couple its output to a corresponding filter 412-1 through 412-*n*. Each of the filters 412-1 through 412-*n* provides a response that may be controlled by the first beamforming controller 420-1. Each filter, e.g. 412-1**, can be controlled to provide a variable delay, spectral response, gain, or some other parameter.

The first beamforming controller 420-1 can be configured with a predetermined set of filter control signals, corresponding to a predetermined set of beams, or can be configured to vary the filter responses according to a predetermined algorithm to effectively steer the beam in a continuous manner.

Each of the filters 412-1 through 412 outputs its filtered signal to a corresponding input of a first combiner 430-1. The output of the first combiner 430-1 may be a beamformed speech reference signal.

The noise reference signal may similarly be beamformed using a set of noise reference microphones 114-1 through 114-*k* comprising a second array of microphones. The number of noise reference microphones, k, can be distinct from the number of speech reference microphones, n, or can be the same.

Although the mobile device 110 of FIG. 4B illustrates distinct speech reference microphones 112-1 through 112-*n* and noise reference microphones 114-1 through 114-*k*, in other embodiments, some or all of the speech reference microphones 112-1 through 112-*n* can be used as the noise reference microphones 114-1 through 114-*k*. For example, the set of speech reference microphones 112-1 through 112-*n* can be the same microphones used for the set of noise reference microphones 114-1 through 114-*k*.

Each of the noise reference microphones 114-1 through 114-*k* couples its output to a corresponding filter 414-1 through 414-*k*. Each of the filters 414-1 through 414-*k* provides a response that may be controlled by the second beamforming controller 420-2. Each filter, e.g. 414-1, can be controlled to provide a variable delay, spectral response, gain, or some other parameter. The second beamforming controller 420-2 can control the filters 414-1 through 414-*k* to provide a predetermined discrete number of beam configurations, or can be configured to steer the beam in substantially a continuous manner.

In the signal enhancement module 400 of FIG. 4B, distinct beamforming controllers 420-1 and 420-2 are used to independently beamform the speech and noise reference signals. However, in other embodiments, a single beamforming controller can be used to beamform both the speech reference signals and the noise reference signals.

The signal enhancement module 400 may implement blind source separation. Blind source separation (BSS) is a method to restore independent source signals using measurements of mixtures of these signals. Here, the term 'blind' has two-fold meanings. First, the original signals or the sources signals are not known. Second, the mixing process may not be known. There are many algorithms available to achieve signal separation. In two-microphone speech communications, BSS can be used to separate speech and background noise. After signal separation, the background noise in speech reference signal may be somewhat reduced and the speech in noise reference signal may be somewhat reduced.

The signal enhancement module 400 may, for example, implement one of the BSS methods and apparatus described in any one of S. Amari, A. Cichocki, and H. H. Yang, "A new learning algorithm for blind signal separation," In *Advances in Neural Information Processing Systems* 8, MIT Press, 1996, L. Molgedey and H. G. Schuster, "Separation of a mixture of independent signals using time delayed correlations," Phys. Rev. Lett., 72(23): 3634-3637, 1994, or L. Parra and C. Spence, "Convolutive blind source separation of non-stationary sources", *IEEE Trans. on Speech and Audio Processing,* 8(3): 320-327, May 2000.

VAD Based on More Aggressive Signal Enhancement

Sometimes the background noise level is so high that the signal SNR is still not good after beamforming or signal separation. In this case, the signal SNR in speech reference signal can be further enhanced. For example, the signal enhancement module 400 can implement spectral subtraction to further enhance the SNR of the speech reference signal. The noise reference signal may or may not need to be enhanced in this case.

The signal enhancement module 400 may, for example, implement one of the spectral subtraction methods and apparatus described in any one of S. F. Boll, "Suppression of Acoustic Noise in Speech Using Spectral Subtraction," *IEEE Trans. Acoustics, Speech and Signal Processing,* 27(2): 112-120, April 1979, R. Mukai, S. Araki, H. Sawada and S. Makino, "Removal of residual crosstalk components in blind source separation using LMS filters," In *Proc. of* 12*th IEEE Workshop on Neural Networks for Signal Processing*, pp. 435-444, Martigny, Switzerland, September 2002, or R. Mukai, S. Araki, H. Sawada and S. Makino, "Removal of residual cross-talk components in blind source separation using time-delayed spectral subtraction," In *Proc. of ICASSP* 2002, pp. 1789-1792, May. 2002.

Potential Applications

The VAD methods and apparatus described herein can be used to suppress background noise. The examples provided below are not exhaustive of possible applications and do not limit the application of the multiple-microphone VAD apparatus and methods described herein. The described VAD methods and apparatus can be potentially used in any application where VAD decision is needed and multiple microphone signals are available. The VAD is suitable for real-time signal processing but is not limited from potential implementation in off-line signal processing applications.

Figure 5:
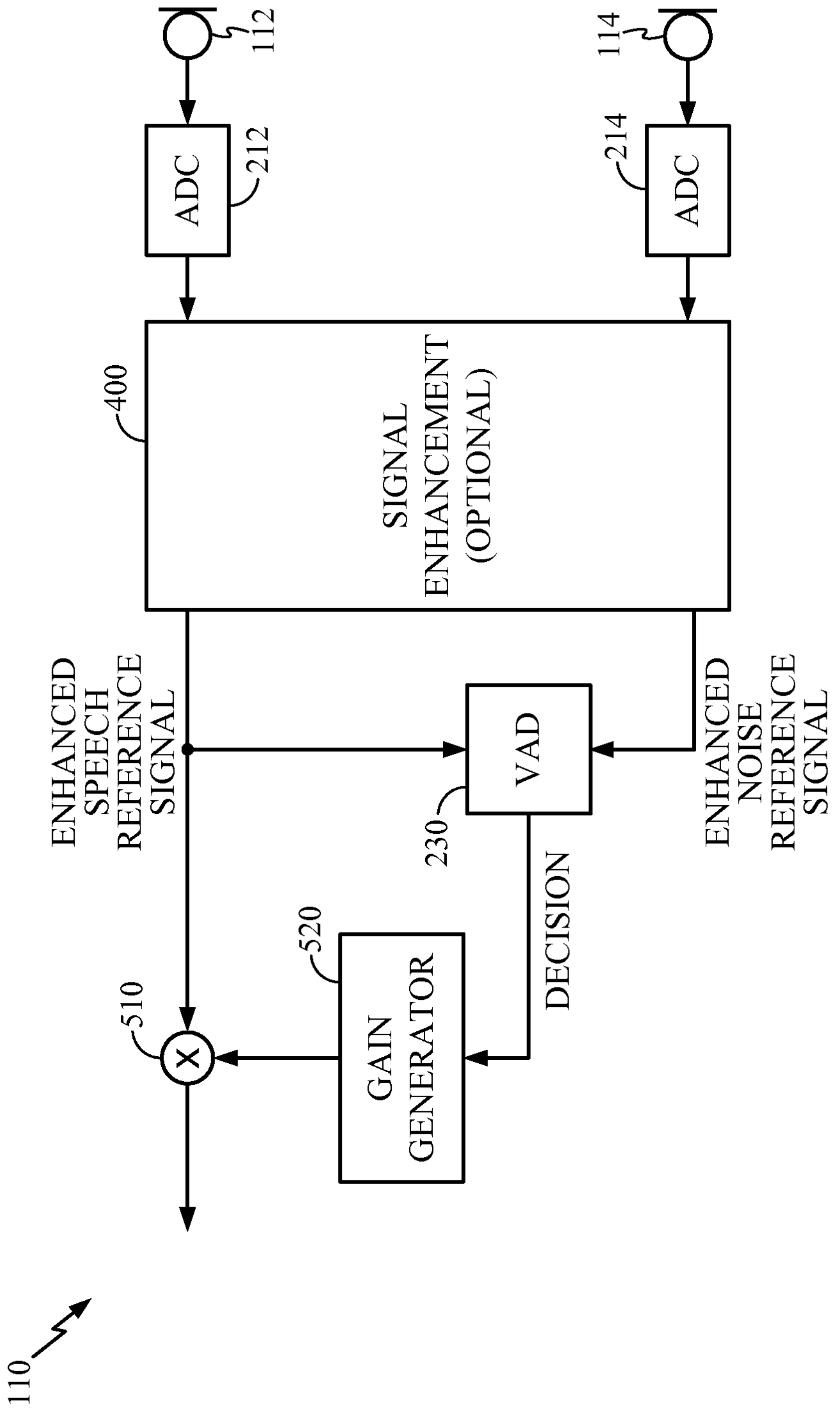
FIG. 5 is a simplified functional block diagram of an embodiment of a mobile device with a voice activity detector with signal enhancement.

FIG. 5 is a simplified functional block diagram of an embodiment of a mobile device 110 with a voice activity detector with optional signal enhancement. The VAD decision from the VAD module 230 may be used to control the gain of a variable gain amplifier 510.

The VAD module 230 may couple the output voice activity detection signal to the input of a gain generator 520 or controller, that is configured to control the gain applied to the speech reference signal. In one embodiment, the gain generator 520 is configured to control the gain applied by a variable gain amplifier 510. The variable gain amplifier 510 is shown as implemented in the digital domain, and can be implemented, for example, as a scaler, multiplier, shift register, register rotator, and the like, or some combination thereof.

As an example, a scalar gain controlled by the two-microphone VAD can be applied to speech reference signal. As a specific example, the gain from the variable gain amplifier 510 may be set to 1 when speech is detected. The gain from the variable gain amplifier 510 may be set to be less than 1 when speech is not detected.

The variable gain amplifier 510 is shown in the digital domain, but the variable gain can be applied directly to a signal from the speech reference microphone 112. The variable gain can also be applied to speech reference signal in the digital domain or to the enhanced speech reference signal obtained from the signal enhancement module 400, as shown in FIG. 5.

Figure 6:
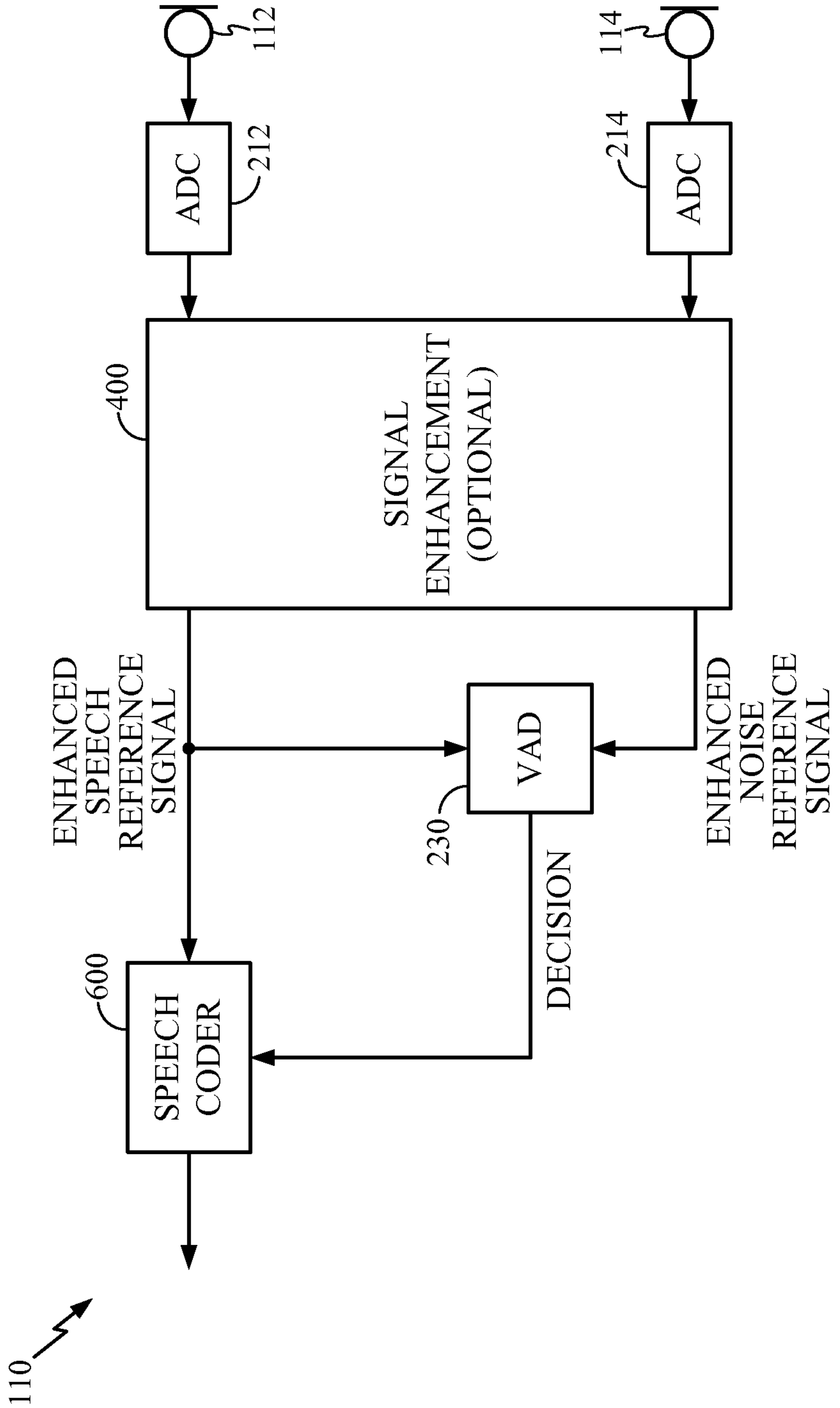
FIG. 6 is a simplified functional block diagram of an embodiment of a mobile device with a voice activity detector with speech encoding.

The VAD methods and apparatus described herein can also be used to assist modern speech coding. FIG. 6 is a simplified functional block diagram of an embodiment of a mobile device 110 with a voice activity detector controlling speech encoding.

In the embodiment of FIG. 6, the VAD module 230 couples the VAD decision to a control input of a speech coder 600.

In general, modern speech coders may have internal voice activity detectors, which traditionally use the signal or enhanced signal from one microphone. By using two-microphone signal enhancement, such as provided by the signal enhancement module 400, the signal received by the internal VAD may have better SNR than the original microphone signal. Therefore, it is likely that the internal VAD using enhanced signal may make a more reliable decision. By combining the decision from internal VAD and the external VAD, which uses two signals, it is possible to obtain even more reliable VAD decision. For example, the speech coder 600 can be configured to perform a logical combination of the internal VAD decision and the VAD decision from the VAD module 230. The speech coder 600 can, for example, operate on the logical AND or the logical OR of the two signals.

Figure 7:
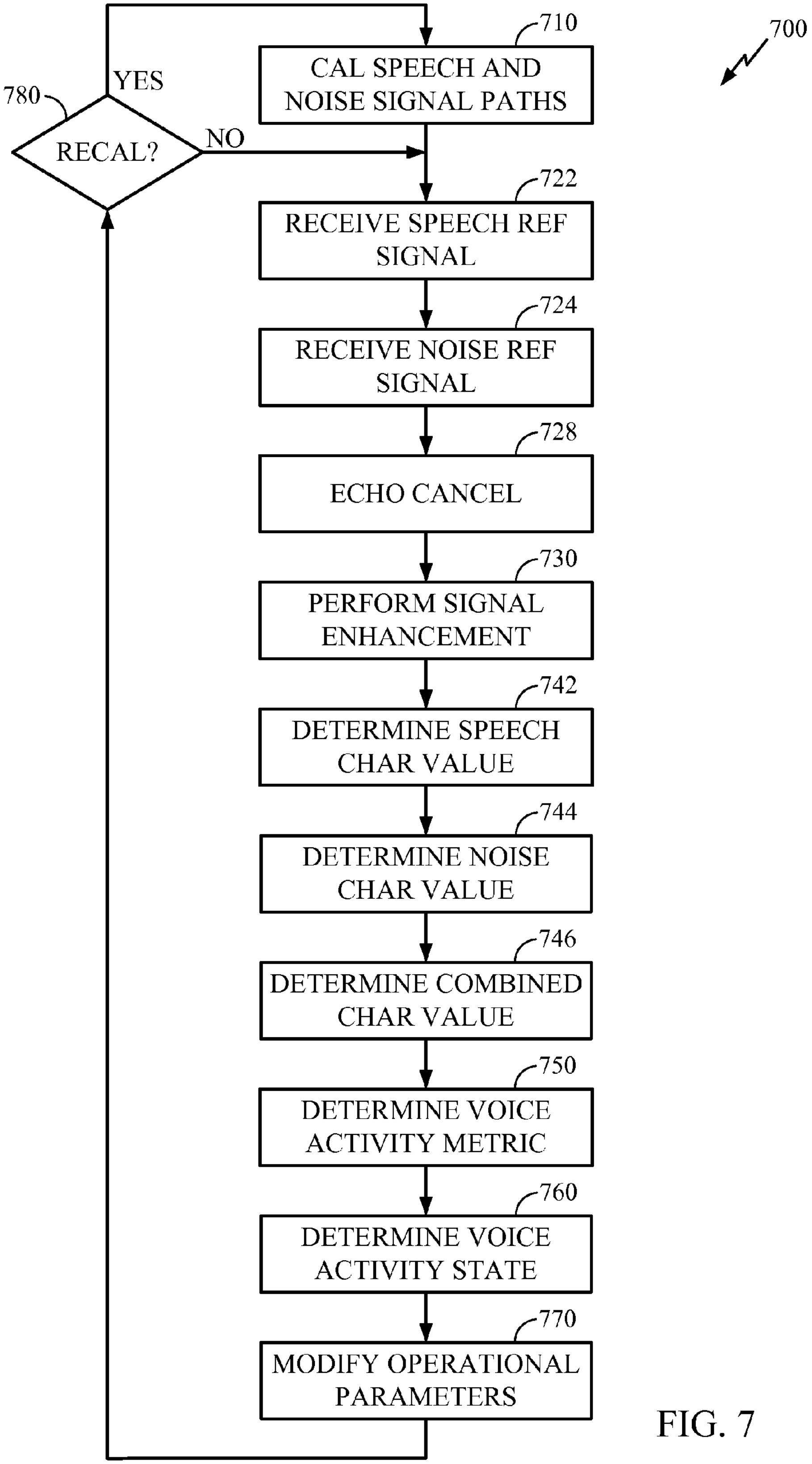
FIG. 7 is a flowchart of a simplified method of voice activity detection.

FIG. 7 is a flowchart of a simplified method 700 of voice activity detection. The method 700 can be implemented by the mobile device of FIG. 1 one or a combination of the apparatus and techniques described in relation to FIGS. 2-6.

The method 700 is described with several optional steps which may be omitted in particular implementations. Additionally, the method 700 is described as performed in a particular order for illustration purposes only, and some of the steps may be performed in a different order.

The method begins at block 710, where the mobile device initially performs calibration. The mobile device can, for example, introduce frequency selective gain, attenuation, or delay to substantially equalize the response of the speech reference and noise reference signal paths.

After calibration, the mobile device proceeds to block 722 and receives a speech reference signal from the reference microphones. The speech reference signal may include the presence or absence of voice activity.

The mobile device proceeds to block 724 and concurrently receives a calibrated noise reference signal from the calibration module based on a signal from a noise reference microphone. The noise reference microphone typically, but is not required to, couples a reduced level of voice signal relative to the speech reference microphones.

The mobile device proceeds to optional block 728 and performs echo cancellation on the received speech and noise signals, for example, when the mobile device outputs an audio signal that may be coupled to one or both of the speech and noise reference signals.

The mobile device proceeds to block 730 and optionally performs signal enhancement of the speech reference signals and noise reference signals. The mobile devise may include signal enhancement in devices that are unable to significantly separate the speech reference microphone from the noise reference microphone, for example, due to physical limitations. If the mobile station performs signal enhancement, the subsequent processing may be performed on the enhanced speech reference signal and enhanced noise reference signal. If signal enhancement is omitted, the mobile device may operate on the speech reference signal and noise reference signal.

The mobile device proceeds to block 742 and determines, calculates, or otherwise generates a speech characteristic value based on the speech reference signal. The mobile device can be configured to determine a speech characteristic value that is relevant for a particular sample, based on a plurality of samples, based on a weighted average of previous samples, based on an exponential decay of prior samples, or based on a predetermined window of samples.

In one embodiment, the mobile device is configured to determine an autocorrelation of the speech reference signal. In another embodiment, the mobile device is configured to determine an energy of the received signal.

The mobile device proceeds to block 744 and determines, calculates, or otherwise generates a complementary noise characteristic value. The mobile station typically determines the noise characteristic value using the same techniques used to generate the speech characteristic value. That is, if the mobile device determines a frame-based speech characteristic value, the mobile device likewise determines a framed-based noise characteristic value. Similarly, if the mobile device determines an autocorrelation as the speech characteristic value, the mobile device determines an autocorrelation of the noise signal as the noise characteristic value.

The mobile station may optionally proceed to block 746 and determine, calculate, or otherwise generate a complementary combined characteristic value, based at least in part on both the speech reference signal and the noise reference signal. For example, the mobile device can be configured to determine a cross correlation of the two signals. In other embodiments, the mobile device may omit determining a combined characteristic value, for example, such as when the voice activity metric is not based on a combined characteristic value.

The mobile device proceeds to block 750 and determines, calculates, or otherwise generates a voice activity metric based at least in part on one or more of the speech characteristic value, the noise characteristic value, and the combined characteristic value. In one embodiment, the mobile device is configured to determine a ratio of the speech autocorrelation value to the combined cross correlation value. In another embodiment, the mobile device is configured to determine a ratio of the speech energy value to the noise energy value. The mobile device may similarly determine other activity metrics using other techniques.

The mobile device proceeds to block 760 and makes the voice activity decision or otherwise determines the voice activity state. For example, the mobile device may make the voice activity determination by comparing the voice activity metric against one or more thresholds. The thresholds may be fixed or dynamic. In one embodiment, the mobile device determines the presence of voice activity if the voice activity metric exceeds a predetermined threshold.

After determining the voice activity state, the mobile device proceeds to block 770 and varies, adjusts, or otherwise modifies one or more parameters or controls based in part on the voice activity state. For example, the mobile device can set a gain of a speech reference signal amplifier based on the voice activity state, can use the voice activity state to control a speech coder, or can use the voice activity state in combination with another VAD decision to control a speech coder state.

The mobile device proceeds to decision block 780 to determine if recalibration is desired. The mobile device can perform calibration upon passage of one or more events, time periods, and the like, or some combination thereof. If recalibration is desired, the mobile device returns to block 710. Otherwise, the mobile device may return to block 722 to continue to monitor the speech and noise reference signals for voice activity.

Figure 8:
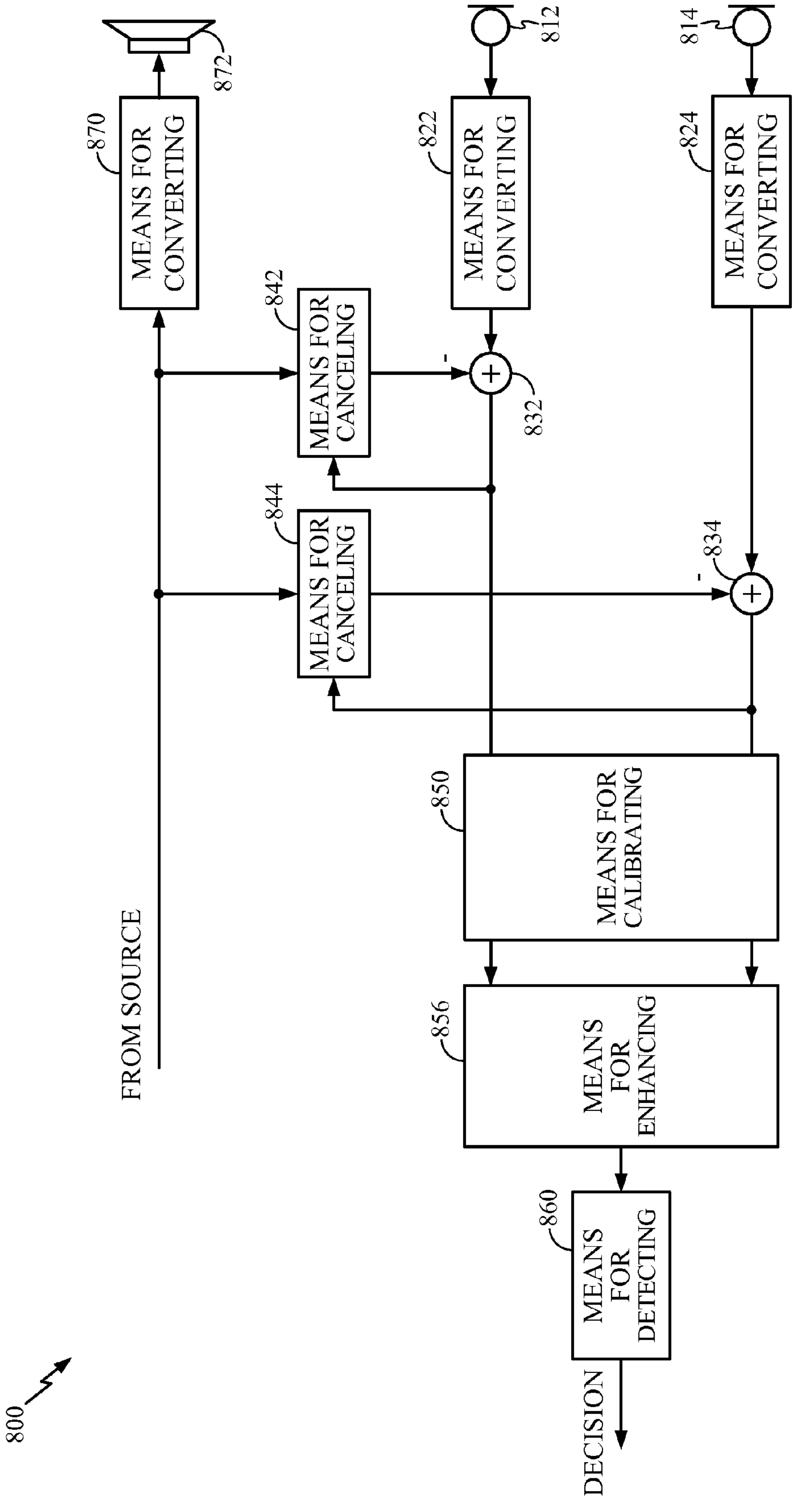
FIG. 8 is a simplified functional block diagram of an embodiment of a mobile device with a calibrated multiple microphone voice activity detector.

FIG. 8 is a simplified functional block diagram of an embodiment of a mobile device 800 with a calibrated multiple microphone voice activity detector and signal enhancement. The mobile device 800 includes speech and noise reference microphones 812 and 814, means for converting the speech and noise reference signals to digital representations, 822 and 824, and means for canceling echo in the speech and noise reference signals 842 and 844. The means for canceling echo operate in conjunction with means for combining a signal 832 and 834 with the output from the means for canceling.

The echo canceled speech and noise reference signals can be coupled to a means for calibrating 850 a spectral response of a speech reference signal path to be substantially similar to a spectral response of a noise reference signal path. The speech and noise reference signals can also be coupled to a means for enhancing 856 at least one of the speech reference signal or the noise reference signal. If the means for enhancing 856 is used, the voice activity metric is based at least in part on one of an enhanced speech reference signal or an enhanced noise reference signal.

A means for detecting 860 voice activity can include means for determining an autocorrelation based on the speech reference signal, means for determining a cross correlation based on the speech reference signal and the noise reference signal, means for determining a voice activity metric based in part on a ratio of the autocorrelation of the speech reference signal to the cross correlation, and means for determining a voice activity state by comparing the voice activity metric to at least one threshold Methods and apparatus for voce activity detection and varying the operation of one or more portions of a mobile device based on the voice activity state are described herein. The VAD methods and apparatus presented herein can be used alone, they can be combined with traditional VAD methods and apparatus to make more reliable VAD decisions. As an example, the disclosed VAD method can be combined with a zero-crossing method to make a more reliable decision of voice activity.

It should be noted that a person having ordinary skill in the art will recognize that a circuit may implement some or all of the functions described above. There may be one circuit that implements all the functions. There may also be multiple sections of a circuit in combination with a second circuit that may implement all the functions. In general, if multiple functions are implemented in the circuit, it may be an integrated circuit. With current mobile platform technologies, an integrated circuit comprises at least one digital signal processor (DSP), and at least one ARM processor to control and/or communicate to the at least one DSPs. A circuit may be described by sections. Often sections are re-used to perform different functions. Hence, in describing what circuits comprise some of the descriptions above, it is understood to one of ordinary skill in the art that a first section, a second section, a third section, a fourth section and a fifth section of a circuit may be the same circuit, or it may be different circuits that are part of a larger circuit or set of circuits.

A circuit may be configured to detect voice activity, the circuit comprising a first section adapted to receive an output speech reference signal from a speech reference microphone. The same circuit, a different circuit, or a second section of the same or different circuit may be configured to receive an output reference signal from a noise reference microphone. In addition, there may be a same circuit, a different circuit, or a third section of the same or different circuit comprising a speech characteristic value generator coupled to the first section configured to determine a speech characteristic value. A fourth section comprising a combined characteristic value generator coupled to the first section and the second section configured to determine a combined characteristic value may also be part of the integrated circuit. Furthermore, a fifth section comprising a voice activity metric module configured to determine a voice activity metric based at least in part on the speech characteristic value and the combined characteristic value may be part of the integrated circuit. In order to compare the voice activity metric against a threshold and output a voice activity state a comparator may be used. In general, any of the sections (first, second, third, fourth or fifth) may be part or separate from the integrated circuit. That is, the sections may each be part of one larger circuit, or they may each be separate integrated circuits or a combination of the two.

As described above, the speech reference microphone comprises a plurality of microphones and the speech characteristic value generator may be configured to determine an autocorrelation of the speech reference signal and/or determine an energy of the speech reference signal, and/or determine a weighted average based on an exponential decay of prior speech characteristic values. The functions of the speech characteristic value generator may be implemented in one or more sections of a circuit as described above.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of detecting voice activity, the method comprising:

receiving a speech reference signal from a speech reference microphone;

receiving a noise reference signal from a noise reference microphone distinct from the speech reference microphone;

determining a speech characteristic value based at least in part on the speech reference signal;

determining a combined characteristic value based at least in part on the speech reference signal and the noise reference signal;

determining a voice activity metric based at least in part on the speech characteristic value and the combined characteristic value, wherein determining the speech characteristic value comprises determining an absolute value of the autocorrelation of the speech reference signal in time-domain; and determining a voice activity state based on the voice activity metric.

2. The method of claim 1, further comprising beamforming at least one of the speech reference signal or noise reference signal.

3. The method of claim 1, further comprising performing Blind Source Separation (BSS) on the speech reference signal and noise reference signal to enhance a speech signal component in the speech reference signal.

4. The method of claim 1, further comprising performing spectral subtraction on at least one of the speech reference signal or noise reference signal.

5. The method of claim 1, further comprising determining a noise characteristic value based at least in part on the noise reference signal, and wherein the voice activity metric is based at least in part on the noise characteristic value.

6. The method of claim 1, the speech reference signal includes the presence or absence of voice activity.

7. The method of claim 6, wherein the autocorrelation comprises a weighted sum of a prior autocorrelation with a speech reference energy at a particular time instance.

8. The method of claim 1, wherein determining the speech characteristic value comprises determining an energy of the speech reference signal.

9. The method of claim 1, wherein determining the combined characteristic value comprises determining a cross correlation based on the speech reference signal and noise reference signal.

10. The method of claim 1, wherein determining the voice activity state comprises comparing the voice activity metric against a threshold.

11. The method of claim 1, wherein:

the speech reference microphone comprises at least one speech microphone;

the noise reference microphone comprises at least one noise microphone distinct from the at least one speech microphone;

determining the speech characteristic value comprises determining an autocorrelation based on the speech reference signal;

determining the combined characteristic value comprises determining a cross correlation based on the speech reference signal and the noise reference signal;

determining the voice activity metric is based in part on determining a ratio of the absolute value of the autocorrelation of the speech reference signal to the cross correlation; and determining the voice activity state comprises comparing the voice activity metric to at least one threshold.

12. The method of claim 11, further comprising performing signal enhancement of at least one of the speech reference signal or the noise reference signal, and wherein the voice activity metric is based at least in part on one of an enhanced speech reference signal or an enhanced noise reference signal.

13. The method of claim 11, further comprising varying an operating parameter based on the voice activity state.

14. The method of claim 13, wherein the operating parameter comprises a gain applied to the speech reference signal.

15. The method of claim 13, wherein the operating parameter comprises a state of a speech coder operating on the speech reference signal.

16. An apparatus configured to detect voice activity, the apparatus comprising:

a speech reference microphone configured to output a speech reference signal;

a noise reference microphone configured to output a noise reference signal;

a speech characteristic value generator coupled to the speech reference microphone and configured to determine a speech characteristic value, wherein determining the speech characteristic value comprises determining an absolute value of the autocorrelation of the speech reference signal in time-domain;

a combined characteristic value generator coupled to the speech reference microphone and the noise reference microphone and configured to determine a combined characteristic value;

a voice activity metric module configured to determine a voice activity metric based at least in part on the speech characteristic value and the combined characteristic value; and a comparator configured to compare the voice activity metric against a threshold and output a voice activity state.

17. The apparatus of claim 16, wherein the speech reference microphone comprises a plurality of microphones.

18. The apparatus of claim 16, wherein the speech characteristic value generator is configured to determine a weighted average based on an exponential decay of prior speech characteristic values.

19. The apparatus of claim 16, wherein the combined characteristic value generator is configured to determine a cross correlation based on the speech reference signal and the noise reference signal.

20. The apparatus of claim 16, wherein the voice activity metric module is configured to determine a ratio of the speech characteristic value to the noise characteristic value.

21. An apparatus configured to detect voice activity, the apparatus comprising:

means for receiving a speech reference signal;

means for receiving a noise reference signal;

means for determining an autocorrelation based on the speech reference signal in time-domain;

means for determining a cross correlation based on the speech reference signal and the noise reference signal in time-domain;

means for determining a voice activity metric based in part on a ratio of the absolute value of the autocorrelation of the speech reference signal to the cross correlation; and means for determining a voice activity state by comparing the voice activity metric to at least one threshold.

22. The apparatus of claim 21, further comprising means for calibrating a spectral response of a speech reference signal path to be substantially similar to a spectral response of a noise reference signal path.

23. A non-transitory computer-readable media including instructions that may be utilized by one or more processors, the computer-readable media comprising:

instructions for determining a speech characteristic value based at least in part on a speech reference signal from at least one speech reference microphone, wherein determining the speech characteristic value comprises determining an absolute value of the autocorrelation of the speech reference signal in time-domain;

instructions for determining a combined characteristic value based at least in part on the speech reference signal and a noise reference signal from at least one noise reference microphone;

instructions for determining a voice activity metric based at least in part on the speech characteristic value and the combined characteristic value; and instructions for determining a voice activity state based on the voice activity metric.

24. A circuit configured to detect voice activity, the circuit comprising:

a first section adapted to receive an output speech reference signal from a speech reference microphone;

a second section adapted to receive an output reference signal from a noise reference microphone;

a third section comprising a speech characteristic value generator coupled to the first section configured to determine a speech characteristic value, wherein determining the speech characteristic value comprises determining an absolute value of the autocorrelation of the speech reference signal in time-domain;

a fourth section comprising a combined characteristic value generator coupled to the first section and the second section configured to determine a combined characteristic value;

a fifth section comprising a voice activity metric module configured to determine a voice activity metric based at least in part on the speech characteristic value and the combined characteristic value; and a comparator configured to compare the voice activity metric against a threshold and output a voice activity state.

25. The circuit of claim 24, wherein any two sections in a group consisting of the first section, second section, third section, fourth section, and fifth section are comprised of similar circuitry.

* * * * *